United States Patent
Sartori Odizzio et al.

(10) Patent No.: US 11,854,072 B2
(45) Date of Patent: *Dec. 26, 2023

(54) APPLYING VIRTUAL MAKEUP PRODUCTS

(71) Applicant: GlamST LLC, San Francisco, CA (US)

(72) Inventors: Agustina Sartori Odizzio, San Francisco, CA (US); Carolina Maria Bañales Gaione, Montevideo (UY); Javier Andrés Camacho Garcia, Montevideo (UY); Juan Francisco Cardelino De Martini, Montevideo (UY)

(73) Assignee: GlamST LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,326

(22) Filed: Mar. 23, 2022

(65) Prior Publication Data

US 2022/0215463 A1    Jul. 7, 2022

Related U.S. Application Data

(63) Continuation of application No. 15/682,690, filed on Aug. 22, 2017, now Pat. No. 11,315,173.

(Continued)

(51) Int. Cl.
*G06Q 30/00* (2023.01)
*G06Q 30/0601* (2023.01)
(Continued)

(52) U.S. Cl.
CPC ..... *G06Q 30/0643* (2013.01); *G06F 3/04845* (2013.01); *G06Q 30/0623* (2013.01); *G06T 11/001* (2013.01); *G06F 16/435* (2019.01)

(58) Field of Classification Search
CPC ........... G06Q 30/0643; G06Q 30/0623; G06F 3/04845; G06F 16/435; G06T 11/001
(Continued)

(56) References Cited

U.S. PATENT DOCUMENTS 9,449,412 B1 * 9/2016 Rogers ............... G06V 10/7557
11,120,495 B2    9/2021 Sartori Odizzio et al.
(Continued)

OTHER PUBLICATIONS

"ModiFace Launches Next-Generation Virtual Makeover Application for Beauty Brands and Publishers: Features New Photo-realistic Makeup and Skin-care Visualization, Foundation Finder, and Beauty Advisor," PR Newswire [New York] Jun. 20, 2013; ProQuest # 1369825156, 4pgs. (Year: 2013).*

(Continued)

*Primary Examiner* — Anand Loharikar
(74) *Attorney, Agent, or Firm* — McDonnell Boehnen Hulbert & Berghoff LLP

(57) ABSTRACT

Techniques are described for applying virtual makeup products. Virtual makeup products, in this context, may include a visual effect and a configuration for the effect, and the visual effect includes one or more layered visual filters. In an example, a system may acquire a base image of a face, acquire a defined region of the face over which to apply a selected virtual makeup product, and generate a makeup image including one or more layered and masked filters based on the selected virtual makeup product and the defined region of the face. After generating the makeup image, a composite image including the makeup image overlaid on the base image can be displayed to simulate the application of a real-world makeup product.

25 Claims, 35 Drawing Sheets

Related U.S. Application Data

(60) Provisional application No. 62/395,207, filed on Sep. 15, 2016.

(51) Int. Cl.
*G06F 3/04845* (2022.01)
*G06T 11/00* (2006.01)
*G06F 16/435* (2019.01)

(58) Field of Classification Search
USPC ................................................ 705/26.1–27.2
See application file for complete search history.

(56) References Cited

U.S. PATENT DOCUMENTS

| | | |
|---|---|---|
| 2003/0014324 A1 | 1/2003 | Donovan et al. |
| 2004/0170337 A1 | 9/2004 | Simon et al. |
| 2006/0134153 A1 | 6/2006 | Kamada et al. |
| 2006/0268101 A1* | 11/2006 | He .......................... H04N 7/147 348/14.07 |
| 2010/0042468 A1 | 2/2010 | Doan et al. |
| 2014/0210814 A1* | 7/2014 | Kim ..................... A45D 44/005 345/629 |
| 2016/0196665 A1 | 7/2016 | Abreu et al. |
| 2018/0075524 A1 | 3/2018 | Odizzio et al. |

OTHER PUBLICATIONS

GlamST: Internet Archive Wayback Machine, www.glamst.com, Dec. 18, 2014, 11 pgs (Year: 2014).

\* cited by examiner

FIG. 11C

APPLYING VIRTUAL MAKEUP PRODUCTS

CROSS-REFERENCE TO RELATED APPLICATION(S)

The present application is a continuation of and claims priority to U.S. application Ser. No. 15/682,690, filed on Aug. 22, 2017, which claims the benefit under 35 U.S.C. § 119(e) of U.S. Provisional Application No. 62/395,207, titled "APPLYING VIRTUAL MAKEUP PRODUCTS," filed Sep. 15, 2016, the contents of each of which are hereby incorporated by reference in their entirety.

The present application is also related to concurrently filed U.S. Non-Provisional application Ser. No. 15/682,661, titled "GENERATING VIRTUAL MAKEUP PRODUCTS," filed on Aug. 22, 2017, which claims the benefit under 35 U.S.C. § 119(e) of U.S. Provisional Application No. 62/395,177, titled "CONFIGURING AND CALIBRATING VIRTUAL MAKEUP PRODUCTS," filed Sep. 15, 2016, the contents of which are both hereby incorporated by reference in their entireties.

COPYRIGHT STATEMENT

The patent or application file contains at least one drawing executed in color. Copies of this patent or patent application publication with color drawing(s) will be provided by the Patent and Trademark Office upon request and payment of the necessary fee.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

At least some of the embodiments of the present disclosure pertain to digital image processing, and more particularly, to generating and calibrating virtual makeup products that can be applied to images to simulate the application of real-world makeup products.

BACKGROUND

Selecting a makeup product to achieve a desired look can prove a daunting process even for the most experienced makeup artist. The term "makeup" generally refers to any type of cosmetic product intended to alter a person's appearance. Makeup products are generally categorized by their intended area of application on a person's body. For example, makeup products intended for the lips can include lipstick, lip gloss, lip liner, etc. Further, makeup products can varying according to several characteristics such as coverage, texture, color and finish.

Much of aesthetic impression formed by a given makeup product is highly subjective based on a viewer's tastes and heavily dependent on the context in which it is applied. For example, the same makeup product may result in vastly different aesthetic impressions when applied to people having different facial characteristics (e.g., facial structure, skin tone, etc.) and/or when applied in the context of other makeup products (e.g., a certain color of lipstick with a certain color of eyeshadow). Accordingly, the process of selecting makeup products typically involves physically trying on multiple products in various combinations. While this might provide the most accurate representation on how a given product will look when physically applied, this process can be time consuming and cumbersome. Further, this method of selection is unavailable to those who prefer to search for and purchase makeup products via the Internet.

Instead, digital image processing technology may be utilized in an attempt to simulate the application of real-world makeup products by digitally altering images of human subjects. For example, general image editing tools such as Adobe Photoshop® allow users to edit digital images, for example to remove skin blemishes, remove red eye, change color levels, composite multiple images, etc.

BRIEF DESCRIPTION OF THE DRAWINGS

One or more embodiments of the present invention are illustrated by way of example and not limitation in the figures of the accompanying drawings, in which like references indicate similar elements.

FIGS. 11A-11C show a series of screen captures of an example graphical user interface for a virtual makeup validation application.

DETAILED DESCRIPTION

From the foregoing, it will be appreciated that specific embodiments of the invention have been described herein for purposes of illustration, but that various modifications may be made without deviating from the scope of the invention. Accordingly, the invention is not limited except as by the appended claims.

Overview

Described herein are techniques for generating, calibrating, and applying virtual makeup products that simulate, in a photo realistic way, the application of real-world makeup products. A virtual makeup product can generally be understood as a combination of a predefined visual effect and a configuration for the effect, where the predefined visual effect is itself a combination of one or more predefined layered filters. In this context, the configuration for an effect configures certain parameters that dictate how the underlying filters for the effect are applied and layered. Accordingly, virtual makeup products may be "applied" to an image (e.g., of a human face) by layering one or more image processing filters over the digital image to produce a composite image that simulate the application of a corresponding real-world makeup product.

The above described scheme allows for high scalability. For example, with a set of as few as 10 predefined and configurable filters (e.g., for smoothing, coloring, etc.) combined in various layering schemes (including different blend modes) into a similar number of predefined and configurable effects, systems in accordance with the present teachings can simulate, in a photorealistic way, thousands of real-world makeup products without individually coding image processing logic for each product. Using this concept of configuring predefined effects, virtual makeup products can be quickly deployed, for example, by modifying the configuration parameters of an existing product to change an attribute (e.g., a new color of an existing lipstick product), generating new configurations to add a new products to existing family of products (e.g., a new brand of metallic gloss), or creating new effects (by defining new combinations of predefined filters) to generate entirely new families of products.

The above described scheme also allows for platform agnostic implementations. In other words, the manner in which effects that define makeup products are configured may be independent of the underlying image processing logic applied to generate the makeup image. This allows for high optimization, for example, by using parallel image processing libraries based on platform specific graphics processing APIs (e.g., Metal in iOS or Accelerate in OSX).

Operating Environment

Figure 1:
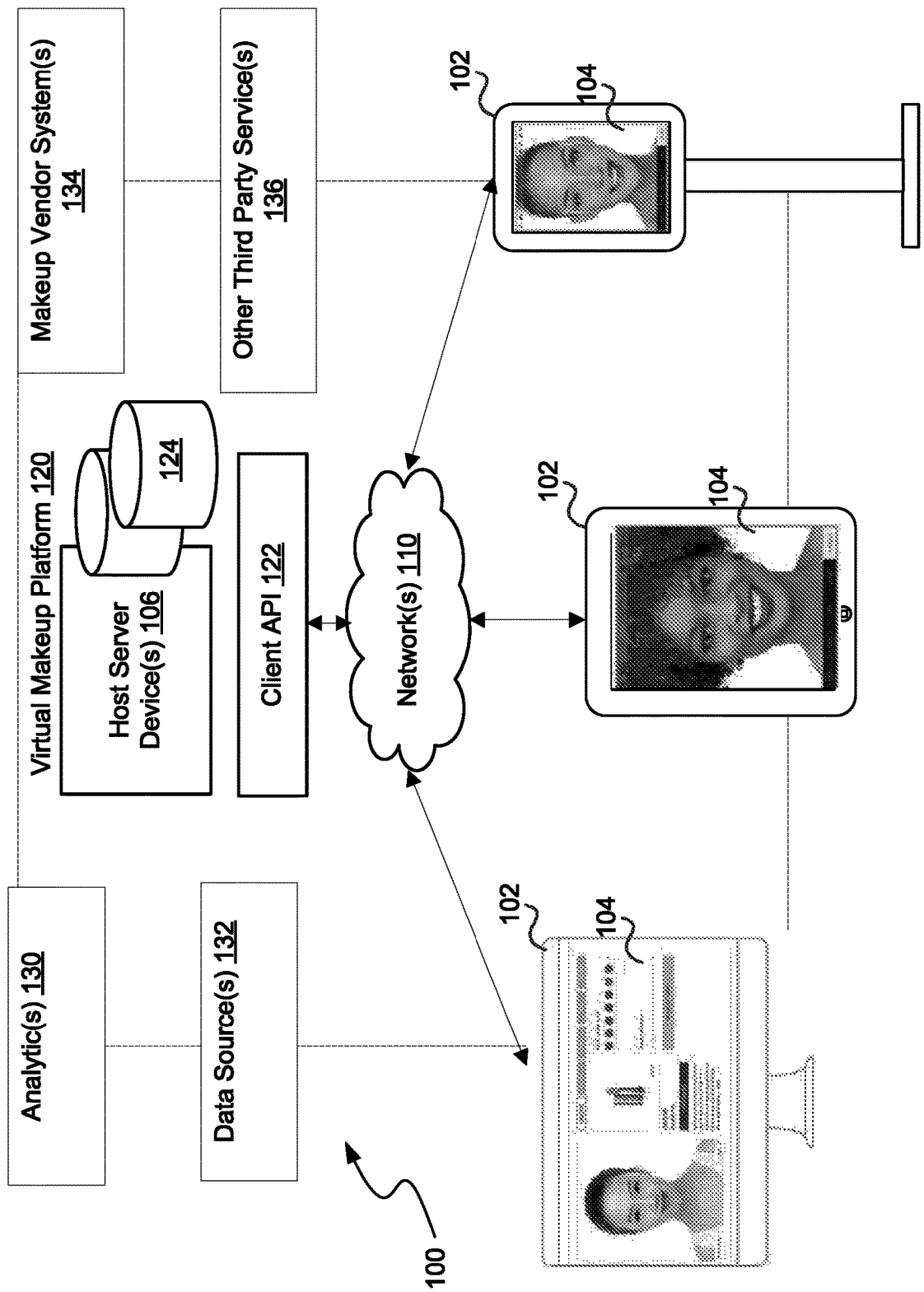
FIG. 1 is a generalized block diagram illustrating an example networked computer environment in which certain embodiments of the present disclosure may be performed.

FIG. 1 is a generalized block diagram illustrating an example networked computer system 100 in which certain embodiments described herein may be implemented.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices (not shown) operating as part of a virtual makeup platform 120 or any of several associated systems 130, 132, 134, or 136 via one or more networks 110. Networks 110 broadly represent one or more local area networks (LANs), wide area networks (WANs), cellular networks (e.g., LTE, HSPA, 3G, and other cellular technologies), and/or other networks using any of wired, wireless, terrestrial microwave, or satellite links, and may include the public Internet.

As shown in FIG. 1, the virtual makeup platform 120 may include or be associated with analytics services 130. As will be described in more detail herein, an analytics service 130 may track and perform analytics on data related to usage behavior. Such analytics may support other services such as product recommendations and targeted marketing. In an embodiment, analytics services 130 may be provided by a third party (e.g., Google Analytics, IBM Web Analytics, Mixpanel, etc.).

Virtual makeup platform 120 may access one or more data sources 132. Data sources generally refers to any sources from which data is received to implement the features described herein. As just a few illustrative examples, data sources may include makeup product vendors, manufactures, retailers, etc., content provider/licensing services, modeling services, and machine generated data sources such as server log files, activity log files, configuration files, messages, network packet data, performance measurements, sensor measurements etc.

In some embodiments, portions of or the platform as a whole may be provided by an entity associated with the real-world makeup product (e.g., designer, manufacturer, vendor, wholesaler, retailer, etc.). Accordingly, virtual makeup platform 120 may include or be associated with one or more makeup vendor systems 134. For example, in some embodiments, the techniques described herein are provided by a centralized virtual makeup platform 120 and made accessible via a website or application developed by a makeup vendor, for example via an application program interface (API) or as part of a software development kit (SDK). Alternatively, or in addition, the techniques described herein may offered as a "white labeled" platform product directly implementable on various makeup vendor systems.

Virtual makeup platform 120 may also include or be associated with any number of other third party service 136. As just a few illustrative examples, other third party services 136 may include social media services (e.g., Facebook®, Twitter®, Snapchat®, etc.), location services, web services, content provider services, etc.

Host Devices

In the embodiment illustrated in FIG. 1, example computer system 100 includes one or more host devices 106 operating as part of virtual makeup platform 120 or any of several associated systems 130, 132, 134, or 136. Host devices 106 may broadly include any number of computers, virtual machine instances, and/or data centers that are configured to host or execute one or more instances of host applications. In general, a host device may be involved, directly or indirectly, in processing requests received from client devices 102. Each host device 106 may comprise, for example, one or more of a network device, a web server, an application server, a database server, etc. A collection of host devices may be configured to implement a network-based service. For example, a provider of a network-based service may configure one or more host devices and host applications (e.g., one or more web servers, application servers, database servers, etc.) to collectively implement a network-based application.

In general, client devices 102 communicate with one or more host applications at host device(s) 106 to exchange information. The communication between a client device 102 and a host application may, for example, be based on the Hypertext Transfer Protocol (HTTP) or any other network protocol. Content delivered from the host application to a client device 102 may include, for example, HTML, documents, media content, etc. The communication between a client device 102 and host application may include sending various requests and receiving data packets. For example, in general, a client device 102 or application running on a client device may initiate communication with a host application by making a request for a specific resource (e.g., based on an HTTP request), and the application server may respond with the requested content stored in one or more response packets.

Operating Environment—Client Devices

Client devices 102 of FIG. 1 represent any computing device capable of interacting with one or more host devices via a network 110. Examples of client devices 102 may include, without limitation, smart phones, tablet computers, handheld computers, wearable devices, laptop computers, desktop computers, servers, portable media players, gaming devices, in store kiosks, and so forth. In general, a client device 102 can provide access to different content, for instance, content provided by one or more host devices.

One or more client applications may be executed at client devices 102. In some embodiments applications executing at client devices 102 may implement one or more a client protocol application programming interfaces (APIs) 122. The client protocol APIs 122 may, for example, process inputs received at client devices 102 and control outputs displayed via a graphical user interface 104 at client devices 102. For example, in an embodiment, a client application executing at client device 102 may access (via API 122) a host server device (not shown) operating as part of virtual makeup platform 120 to retrieve configuration parameters for a particular requested virtual makeup product. The client application may then use local image processing libraries along with the retrieved configuration parameters to generate makeup image in response to a request to apply a virtual makeup product.

The client protocol APis 122 serve as an interface between the user devices 102 and host devices at the virtual makeup platform 120. One or more repositories and/or databases 124, which support certain utilities may store content required for implementing the virtual makeup features described herein. For example, repositories/databases 124 may store host applications, content (e.g., images/video), data related to image processing (e.g., image processing libraries, virtual makeup products, predefined visual effects, virtual makeup looks, etc.), information relevant to the users (e.g., registration information or usage statistics), etc., metadata, and any other data used in implementing the techniques described herein. In some embodiments, repositories/databases 124 may include an open-source cross-platform document-oriented database, such as MongoDB. In such embodiments, the repositories/databases 124 may use dynamic schemas and/or JavaScript Object Notation (or JSON-like) documents.

Note that the term "application" is used above for illustrative purposes only. One skilled in the art will recognize that the user interfaces described herein could be accessible via one or more of a web browser, mobile application, software program, or an over-the-top (OTT) application.

Virtual Makeup Platform

Figure 2A:
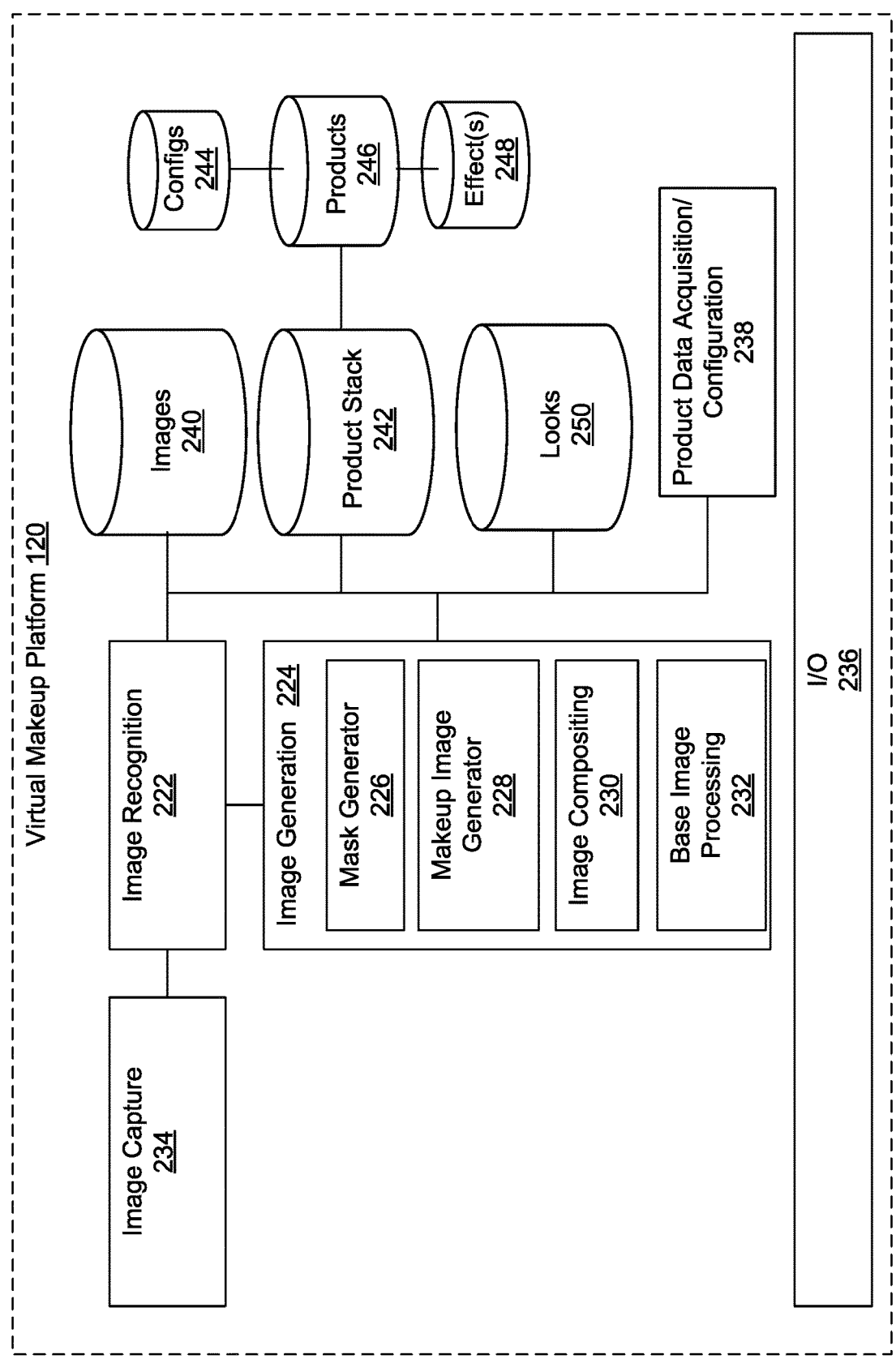
FIG. 2A is block diagram showing the high-level architecture of an example virtual makeup platform.
Figure 2B:
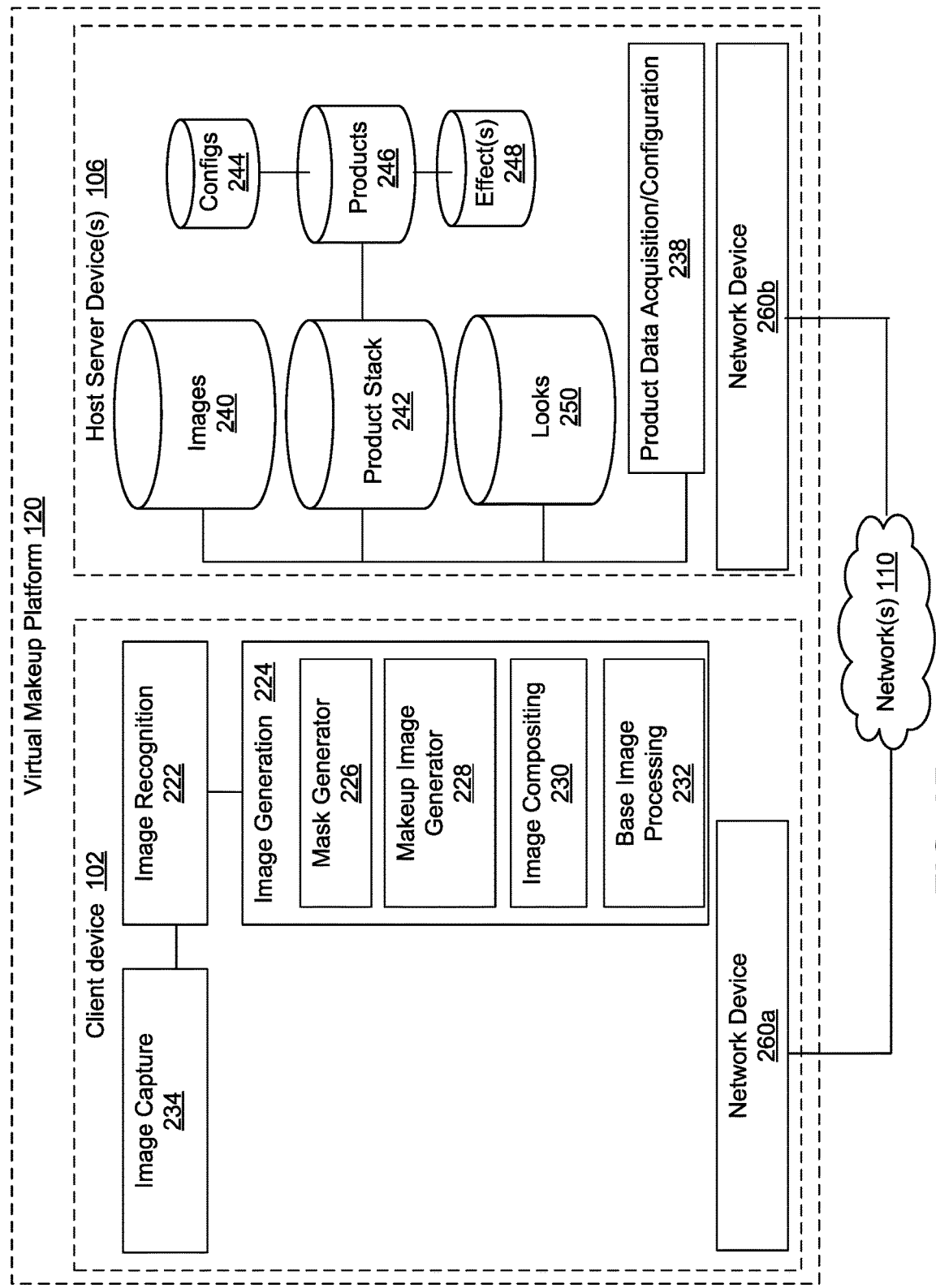
FIG. 2B is a block diagram showing the architecture of an example virtual makeup platform similar to that illustrated in FIG. 2A in which certain components are distributed at client and host server devices.

FIG. 2A is block diagram that illustrates at a high level an architecture including various components of an example virtual makeup platform 120, according to some embodiments. A platform may include more or fewer components than as shown in FIG. 2A while still remaining within the scope of the presently described innovations. Further, some of the described components may be combined or divided differently than as shown in FIG. 2A. In general, some of the components of virtual makeup platform 120 may be described as "modules" or "engines" and may include a general purpose general or special purpose hardware (e.g., general or special purpose processors), firmware, an/or software embodied in a non-transitory computer-readable (storage) medium for execution by one or more processor. Depending upon the particular implementation, the various components described with respect to FIG. 2A may be implemented at a single computing device (e.g., a host server or client device) or distributed across several computing devices. In some embodiments, certain functionalities (e.g., image capture) may be performed at a client device while other functionalities (e.g., image recognition) may be performed at a remote server device. For example, FIG. 2B shows an example embodiment of a virtual makeup platform 120 in which the some components described with respect to FIG. 2A are instantiated at client device(s) 102 and some components are instantiated at remote host server device(s) 106 and in which the devices are communicatively coupled via network(s) 110 using network devices 260a-b. As mentioned, the embodiment shown in FIG. 2B is only an example provided for illustrative purposes. Components of virtual makeup platform 120 may be distributed differently in other embodiments. For example, an embodiment is contemplated in which an image recognition module 222 is instantiated at a remote host server device 106 instead of at client device 102.

As shown in FIG. 2A, virtual makeup platform may include an image recognition module 222 configured to receive and process digital images and perform tasks such as facial feature detection. Functionalities of image recognition module 222 will be described in more detail below. Image recognition module may receive or retrieve digital images of a human face from image capture module 232 and/or from a database 240 of pre-existing digital images (for example of models). Image capture module 234 may include the software and/or hardware for capturing images (including video) at a client device for virtual makeup application. For example image capture module may include a digital camera including one or more optical sensors for conversion of received light to digital information (e.g., charge-coupled devices (CCD), complementary metal-oxide semiconductor (CMOS) phototransistors, etc.). Image capture module 234 may also include software for pre-processing raw image data prior to processing by image recognition module 222. In some embodiments certain image recognition functionality may be performed by image capture module 234.

Virtual makeup platform may also include an image generation module 224 configured to generate outputs that represent a virtual application of a real-world makeup product. Specifically, image generation module 224 may include a mask generator 226 that generates overlay masks based on user inputs defining facial regions in a digital image of a human face and/or facial features automatically detected by image recognition module 222.

Image generation module 224 may also include a makeup image generator 228 that generates a digital image or image filter based on a virtual makeup product that is overlaid on a base image of human face to approximate the application of a real-world makeup product. As will be described in more detail later, a virtual makeup product(s) may be generally understood as a combination of one or more effects and configurations for the one or more effects. Each effect can be generally understood as a combination of one or more image filters on one or more layers. A filter in this context is a particular visual processing effect (e.g., a blur and/or application of color) and can be configured based on certain values such as coverage, finish, etc. The information defining one or more virtual products may be defined in a product stack 242 that includes the one or more defined products 246 as well as the underlying effects 248 and configurations for the effects 244 for each product. Particular combinations of multiple virtual makeup products (e.g., a virtual eyeshadow and a virtual blush) may be stored as "looks" 250. In some embodiments, virtual makeup products, effects, looks, etc. may be represented in the form of JSON objects.

As will be described in more detail, in an embodiment, image generation module 224 (including the various subcomponents) receives a user input selecting a virtual makeup product included in the product stack 242 to apply to a base image (either captured via image capture module 234 or acquired from image database 240). A mask is drawn is drawn over the base image by mask generator 226 bounding a region of interest. Using the defined effect(s) and configurations for each effect of the selected virtual makeup product, the makeup image generator 228 applies a mask filters (e.g., feather, multiply, texture, etc.) on one or more layers within the drawn mask. In some cases, a base image processing module 232 processes the actual base image to, for example, adjust lighting or clear imperfections. Once the overlaying makeup image is generated, an image compositing module 230 composes the base image along with any overlaid makeup images and outputs a composite image that shows an application of a virtual makeup product to a face in the base image.

An input/output subsystem 236 couples the components of virtual makeup platform 120 to input and output devices of any type. For example in an embodiment where the components of platform 120 are instantiated at a client device 102, I/O subsystem 236 may couple to a touch screen display device through which outputs are displayed and user inputs (e.g., touch gestures) are received, an image capture device through which image data is received, and/or a network device through which data is transmitted/received over a computer network. Similarly, in an embodiment in which components of platform 120 are instantiated at a host server device, I/O subsystem 236 may couple to a network device (e.g., network devices 260a-b shown in FIG. 2B) through which data is transmitted/received over a computer network. A person having ordinary skill will understand that the aforementioned input/output systems are provided for illustrative purposes and are not intended to be limiting.

Virtual Makeup Products, Effects, and Filters

Figure 3:
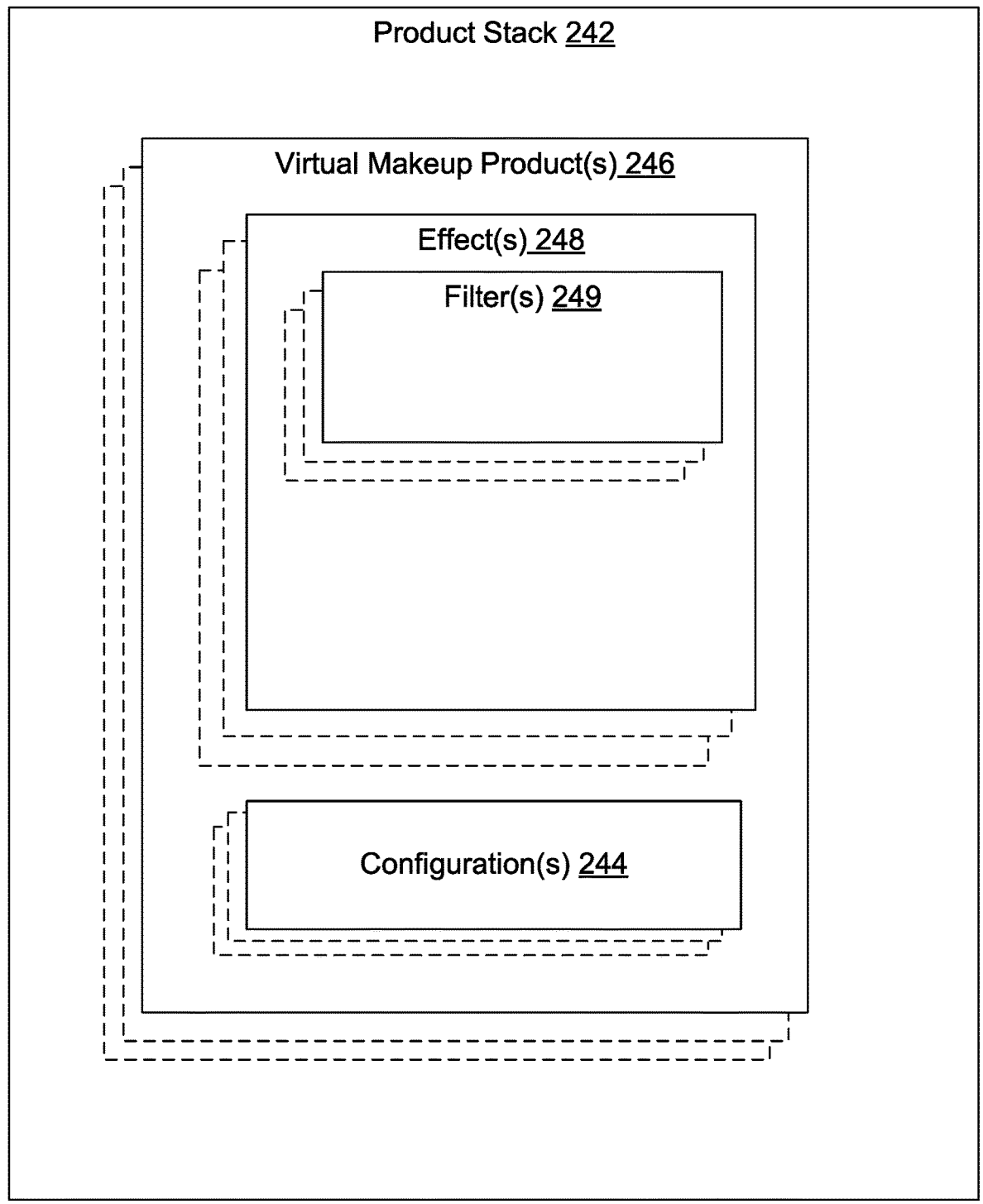
FIG. 3 is block diagram illustrating virtual makeup product stack that may be part of the virtual makeup platform described with respect to FIGS. 2A-2B.

FIG. 3 is block diagram that illustrates at a high level various aspects of a virtual makeup product stack 242. As previously mentioned the virtual makeup product stack can include multiple virtual makeup products 246, each calibrated to approximate their real world counterpart products. For example a makeup manufacturer may offer a makeup product for a particular facial region (e.g., the lips for lipstick) and in a particular shade, finish, and coverage. A virtual makeup product may be defined with configured effects that approximate the look of the real world product when applied to a digital image of a face. Each virtual makeup product 246 represents a combination of an effect 248 along with a configuration 244 for the effect. Effects 248 represent combinations of various layers of visual filters 249. A visual filter 249 can generally be understood as a particular visual effect (e.g., blur, color overlay, etc.).

When a virtual makeup product 246 is selected for application to an image, two types of image operations are generally performed. First, one or more masks are generated (i.e., drawn) in one or more transparent layers overlaid on the base image. These masks define a boundary of region of interest within which the virtual makeup product will be applied. For example, when a virtual lipstick is selected to be applied to an image of lips, a mask is generated that defines a boundary of the lip region. This mask can be based on user input defining the region and/or automatic facial feature detection. Second, after defining the boundary of the mask, an image operation is performed to apply the one or more filters 249 (based on the configured effect), thereby generating a makeup image.

As used herein, filters 249 can be described in the context of two categories, mask filters and image filters. The aforementioned filters 249 applied within a mask and overlaid on an image can generally be referred to as "mask filters." As mentioned, these mask filters result in image operations performed on a layer over the base image, but otherwise do not necessarily impact the base image itself. For example, a mask filter may involve drawing a mask (as described above), coloring a region within the mask (e.g., using mathematical morphology), and performing a blend operation to smoot the transition at the mask boundary. This blend operation can include alpha matting (i.e., a Gaussian blur of the alpha channel). Examples of filters that may be applied in this context include, but are not limited to, feather, multiply, lighten, texture, lightfocus, and glitter, which will be described in more detail below.

Conversely, image filters refer to image operations performed on the base image itself, for example to adjust color, contrast, etc. in the base image. Image operations performed on the base image can, in some embodiments, work on multiple channels within the image. For example, a noise reduction operation to remove impurities in a face may include adjustments in the saturation, noise, blurring, etc. in the underlying base image. Some examples image filters include, but are not limited to, decolorate, sharpen, lighting (adjust overall illumination in the image), blur (reduce detail, soften edges), threshold (highlight high intensity areas of the image), and anisotropic diffusion (similar to blur, but better preservers details while smoothing).

Virtual makeup platform 120 may include multiple pre-defined effects 248 and similarly may include a multiple pre-defined filters 249 that comprise the effects. The following are several examples of pre-defined filters 249 that may form one or more of multiple pre-defined effects 248 utilized by virtual makeup platform 120. As mentioned above, this list is not exhaustive and is provided to illustrate how filters may be defined, according to some embodiments.

A decolorate filter can operate either as a mask or image filter, accordingly modifying the base image. The decolorate filter operates over the skin of a person depicted in the base image and serves to reduce the saturation of the depicted color, while maintaining other properties, such as brightness, tone, contrast, etc. A decolorate filter may be defined by certain parameters, including, but not limited to, a range (e.g., [0, 1]) in the amount of retained color information with 0 representing the removal of all color and 1 representing retaining the current color information. Depending on the needs of a given effect, a suggest value may generally be on the order of 0.9.

A texture image filter generally operates as a mask filter and serves to apply a masked texture image over a region of interest in the base image. For example, consider a real world makeup product, such as an eyeshadow, that when applied introduces a certain textured effect over the surface of the skin. When applied as a virtual makeup product, this effect may include the application of a masked texture image filter. The process of applying such a textured filter can include accessing a stored texture and performing an image operation to apply the selected texture in an overlay within a defined mask boundary. A parameter for the texture image filter can include the opacity of the texture when applied as a mask filter. For example, the parameter may include a range [0, 1] with 0 being completely transparent (i.e., not visible) and 1 being completely opaque. Selected values for the parameter will depend on the coverage of the real world makeup product (i.e., how much product is applied with each application). For example, a lip gloss may be mostly transparent when applied having a high gloss but low coverage whereas a lipstick may have a higher coverage.

A light focus filter generally operates as a mask filter and serves to add non-uniform illumination to a masked region of interest in the underlying base image. In other words, a lightfocus filter can be used to simulate the effect of reflected light on a portion of the base image. This has particular application for simulating the effect of a high gloss makeup product (e.g., lip gloss) when applied. In an embodiment, the filter includes a reference curve (e.g., the contour of an eye) that can be defined by user input and/or automatically using facial feature detection. Image processing (e.g., lightening/darkening) is applied according to the reference curve such that the light decays as the position moves away from the reference curve. The resulting effect simulates light falling on a three dimensional surface even where the processed image is in two dimensions. In an embodiment, the parameters affecting a lightfocus filter includes shape, color and opacity. Shape, generally defined to be the direction and rate of decay in light from the reference curve will depend on the defined region of interest. Using an image recognition process, a detected face in a base image can be classified as one of several predefined shapes. Face shape classifications can include, but are not limited to, round (e.g., rounded, equal length and width), oval (e.g., rounded, approximately 1.5× length to width ratio, generally balanced and symmetrical overall), rectangular (sharp jawline, shorter forehead, generally balanced and symmetrical overall), or heart shaped (widest at the forehead, narrower pointed chin). Using a classification of the detected face, certain assumptions can be made about the shape in a region of interest (e.g., eyes, lips, forehead, cheek, etc.). In certain embodiments, the shape parameter can be defined as a number value in a range (e.g., [0, 1]) with 0 being no curvature (i.e., flat) and 1 being a predefined max curvature. Note that any given region of interest may include multiple reference curves each with a defined shape parameter. The color parameter can define the color of light used to illuminate and can be represented as a color hexadecimal code.

A color dots filter generally operates as a mask filter and serves to apply light and/or dark dots over the base image. Such a filter can be used to complement a glitter filter or effect. In other words, the overlaid light and dark dots can be added independently to simulate specks of glitter in a real world product when applied. Parameters for a color dot filter can include shape (i.e., shape of the dot distribution), color, type (i.e., type of coloring used), an intensity multiplier (i.e., controlling the intensity of each color dot), spread (i.e., how large the coverage area is), and opacity. As an example, if the glitter in a real world product is the same color as the product itself (e.g., red glitter specs in a red lipstick), the color dot filter can be used to add some bright white dots thereby simulating reflection of light off of some of the glitter pieces.

In some embodiments, the shape of the dot distribution may be dependent on the detected shape of the face and specific regions of interest as previously described with respect to the light focus filter.

A glitter filter can represent an extended version of the color dots filter that is specifically configured to approximate the glitter in a real world makeup product. In some embodiments, a glitter filter may be implemented as two layers of randomly arranged light and dark color dots that simulate the applied glitter. As with the color dots filter, the glitter filter may be defined by a number of parameters, including but not limited to, shape (i.e., shape of the dot distribution), color, type (i.e., type of coloring used), an intensity multiplier (i.e., controlling the intensity of each color dot), spread (i.e., how large the coverage area is), and opacity.

A threshold filter can operate either as a mask or image filter and when applied saturates the brightest pixels (as defined by a threshold value). These pixels above the threshold value are turned full white and may be referred to as bunt pixels. The parameters for the threshold filter include at least the threshold value which can be defined as a single real value, for example, representing an absolute brightness value or a percentage of the total pixels in the image. The threshold value can be set within a range (e.g., [0,1]) in which 0 represents totally burning of all pixels and 1 represents burning of no pixels.

A lighting filter generally operates as an image filter and when applied lightens or darkens the pixels in the base image. The lighting filter may be defined as an array of three multiplying values that are used to multiply three color channels in an image. For example, values for the array may be set within a range (e.g., [0 0 0] to [inf inf inf]) with [1, 1, 1] representing no effect, values less than 1 darkening the image, and values greater than 1 brightening the image.

A blur filter can operate either as a mask or image filter and serves to smooth the transition between pixels. As an example, a blur filter may implement a low pass Gaussian blur to reduce noise and/or detail. In an embodiment, a blur filter can be defined as an array of two elements [x y] with the x element defining the blur function in an x direction and the y element defining the blur function in a y direction. Here, each value may represent the width of pixels to be blurred in each direction.

A feather filter can operate either as a mask or image filter and serves to adjust the opacity of an applied visual effect over an area. In other words, a feather filter can define a decay in transparency over a particular area. For example, application of a feather filter can create a blending effect at a border area of another mask filter without directly impacting the underlying base image. In an embodiment, like the blur filter, a feather filter can be defined as an array of two elements [x y] with the x element defining the rate of decay in transparency in an x direction and the y element defining the rate of decay in transparency in a y direction. Here, each value may represent the width of pixels in each direction over which the transparency decay operation is performed.

As previously mentioned, the above described filters represent only some example of filters that may be applied on multiple layers to form an effect of a virtual makeup product. A person having ordinary skill will recognize that additional filters may be implemented depending on the application. In some cases, one or more of the aforementioned filters may be applied using open source multiplatform image processing libraries. Multi-platform image processing libraries may be implemented so that the underlying image processing code is device agnostic and suitable for use on a number of different platforms (Linux, OS X, Windows, iOS, Android, etc.).

As previously described an "effect" in the context of a virtual makeup product can represent a combination of one or more filters applied on one or more layers. For example, an effect can include different layers of different types of filters resulting in a generated makeup image. Each layer may be further be defined by a blend mode that defines a blending operation (e.g., feather) and the layers to which that operation will apply (e.g., base+layer 1 or layer 1+layer N). As an illustrative example, an eyeshadow shimmer effect may include the application of the following filters: sharpen, feather, light focus, glitter, color dots, and texture. The various filters are applied on multiple layers and composited to form a makeup image that is overlaid on a base image of a human face to simulate an effect of the application of a real world eyeshadow product.

In general, layers can be configured using an array of opacities that control the strength of the effect of the filter (i.e., the alpha channel used in the blend operation). The only difference may be the blend mode used to compose the layers. Blend mode, in this context defines how any two or more layers are composited together. For example, a given effect may include mask operations on four layers (A, B, C, and D). Each layer may have a blend mode defined with respect to another layer in the makeup image. For example, how layer A blends with layer B, etc. In some embodiments virtual makeup platform 120 may include pre-defined blend modes that can be set for various layers for a given effect. For example, a lighten layer (e.g., for a color mask operation) may use a predefined "lighten" blend mode, a multiply layer (e.g., for a color mask operation) may use a predefined "multiply" blend mode, a texture layer (e.g., to apply glitter dots) may use a "hard light" blend mode.

In an embodiment, effects can be configured as virtual products by setting values for one or more of the following general attributes: shape, color, finish, and coverage. Shape as previously described may depend on the region of application for a particular virtual makeup product. The region can define how the effect will be applied. For example, gloss and lipstick are applied to a lip region. Foundation, powder, and concealer may be applied to the entire face other than the lips. Eyeshadow and eyeliner may be applied to regions of skin surrounding the eye. These are just example regions that may be defined for various makeup products. More refined regions (e.g., jawline, cheek bone, forehead, etc.) may also be defined. In some embodiments, regions can be defined based on an algorithm that varies according to a detected face shape classification (e.g., oval, round, etc.). Color is self-explanatory, but can be defined according to different color models, for example, RGB (red green blue values), HSB (hue saturation brightness), HSV (hue saturation value), hexadecimal code, etc., standard color names. Finish can define the texture and/or level of reflectivity of an applied effect. For example, a virtual lip gloss product may include an effect with a glossy finish while a virtual powder product may include an effect with a matte finish. Coverage defines the amount of product that is applied for a given input. For example, coverage can be categorized at three levels low, medium and high) and can be adjust based on the type of product (e.g., sheer, medium, full, etc.). Further, in some embodiments, this coverage parameter may define a range of outputs that are dependent on a user input to apply the product. For example, in the case of a pressure sensitive touch screen display, the pressure at which the user applies the product may impact how much product is applied for any given input. Consider a virtual lipstick product. Configuration of the coverage parameter may define, for example, the opacity of an applied mask filter. This value can then be modified based on a detected pressure input.

The following shows an example configuration that may be applied to an effect (e.g., a blush effect) to define a virtual blush product. As mentioned previously, the configuration may be stored in the form of a JSON object.

```
{
    "name" : "illuminating",
    "region" : "blush" ,
    "color" : "default" ,
    "effect" : {
        "name" : "blush1",
        "threshold" : 1,
        "decolorate" : 0.95,
        "feather" : [10, 10],
        "blur" : null,
        "layers" : [
            {
                "name" : "multiply",
                "alpha" : [0.252, 0.28, 0.53]
            },
            {
                "name" : "lighten",
                "alpha" : [0.091, 0.133, 0.21]
            }
        ]
    }
}
```

As shown above, the configuration sets values for various filter parameters (e.g., threshold, decolorate, feather, blur, etc.) as well as layer parameters (e.g., multiply, lighten, etc.) thereby defining how the effect will be applied to generate the makeup image.

Figure 8A:
FIGS. 8A-8I show screen captures of example composite images that illustrate how virtual makeup application can differ based on effect configurations.
Figure 8B:
Figure 8C:
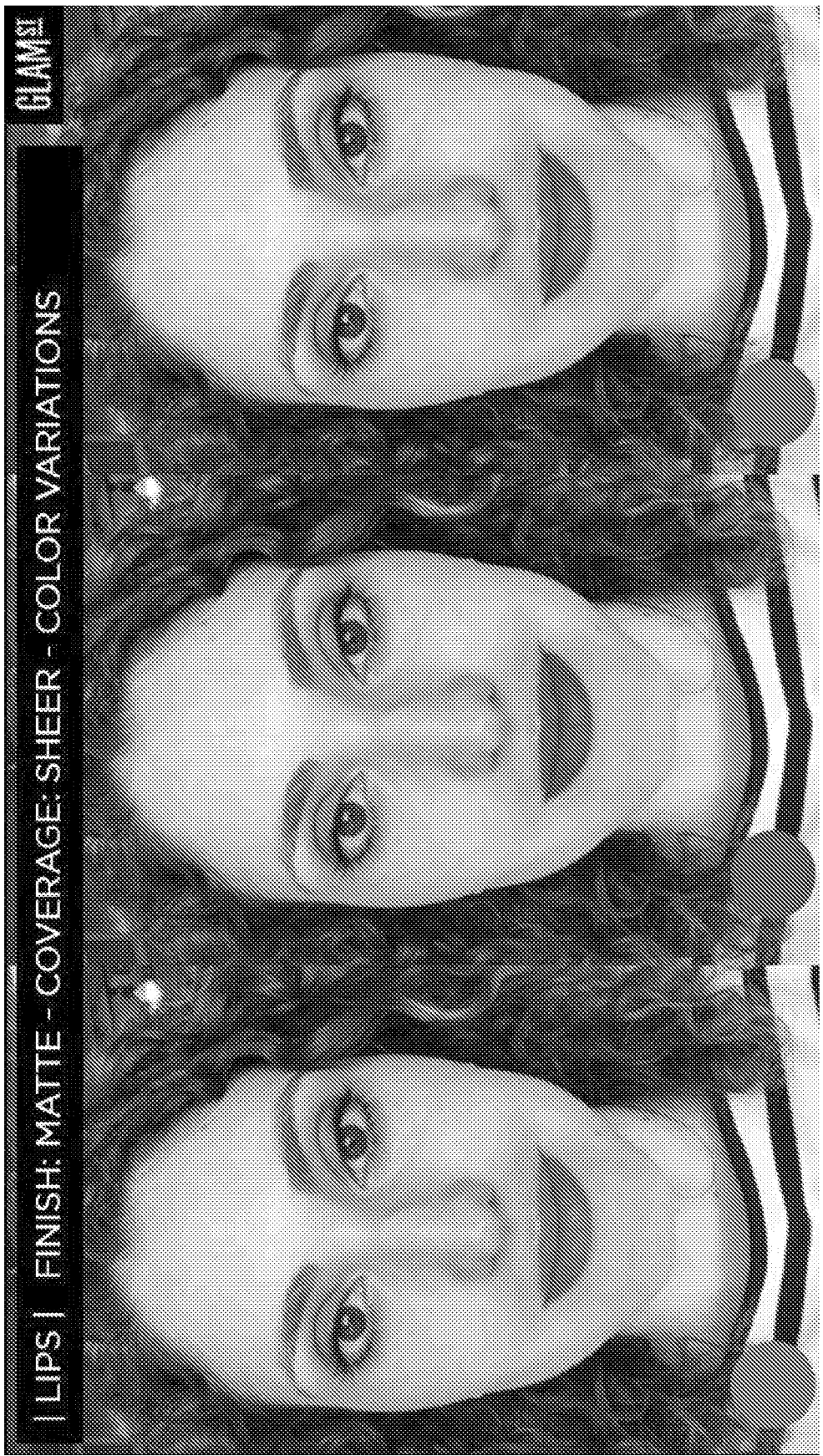
Figure 8D:
Figure 8E:
Figure 8F:
Figure 8G:
Figure 8H:
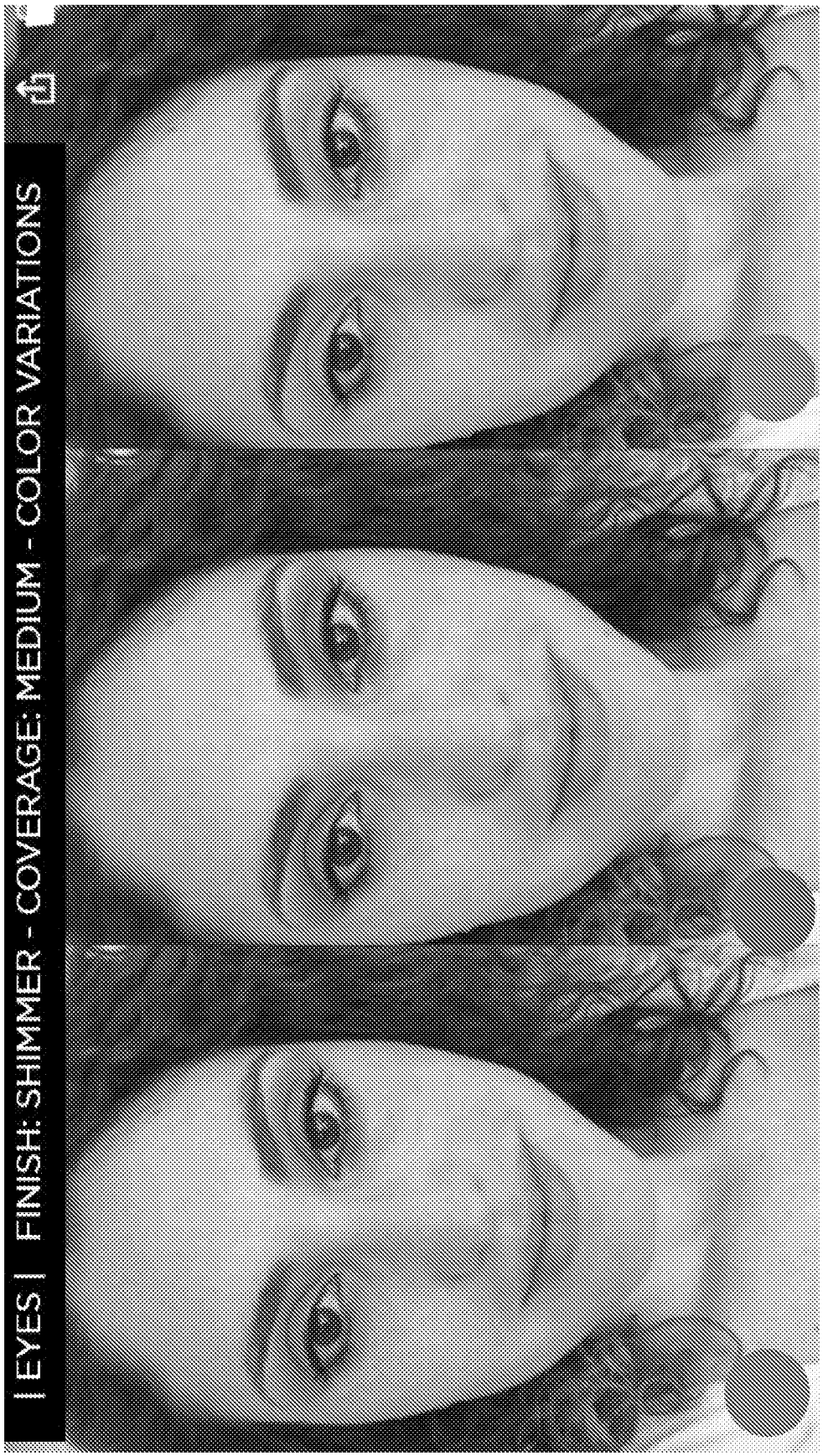
Figure 8I:
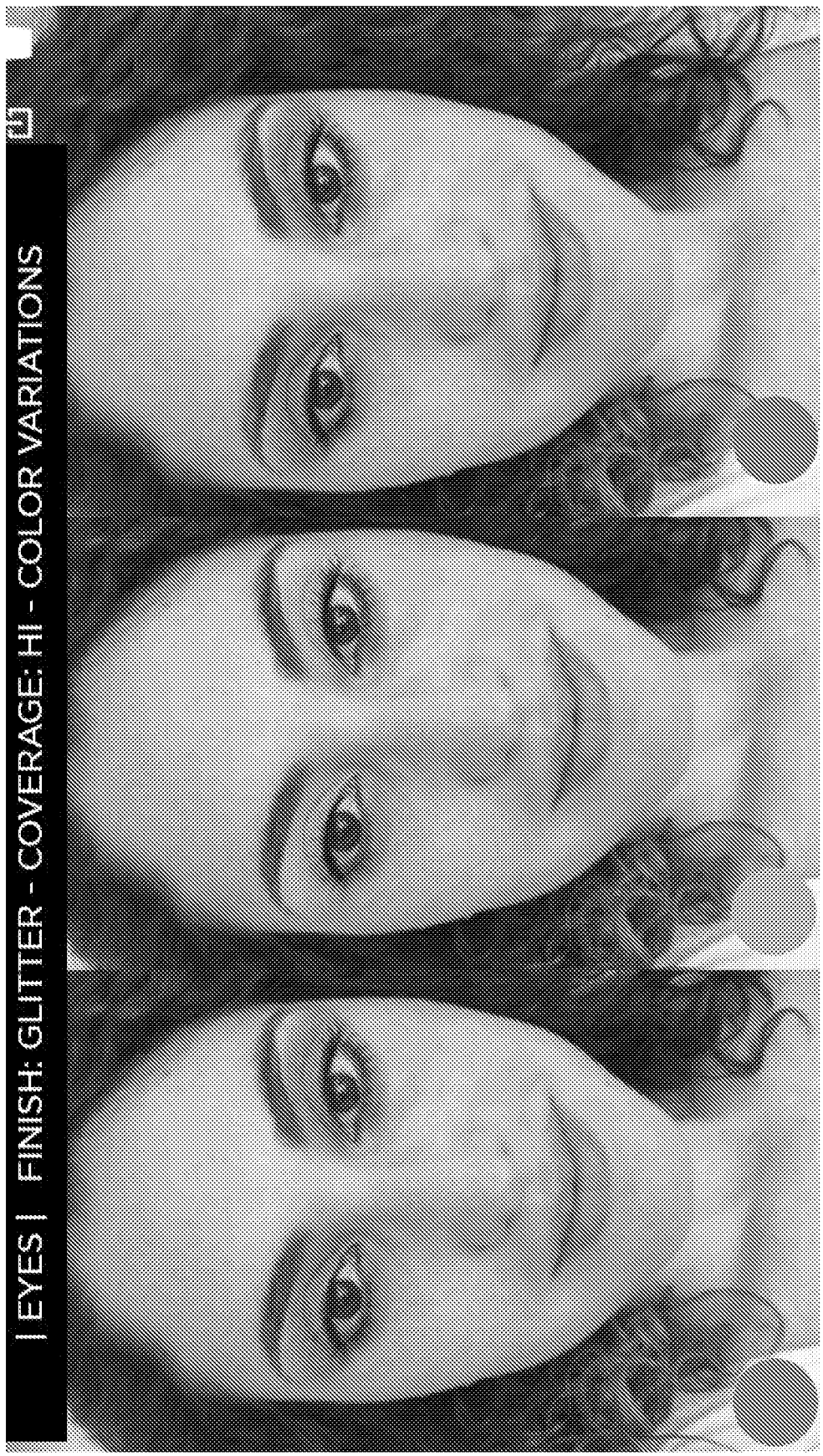

FIGS. 8A-8I show screen captures of example composite images that illustrate how virtual makeup application can differ based on effect configurations. Specifically, FIG. 8A shows composite images of a virtual lipstick product with a matte finish applied using three different coverage variations. FIG. 8B shows composite images of a virtual lipstick product with a satin finish applied using three different coverage variations. FIG. 8C shows composite images of a virtual lipstick product with a matte finish and sheer coverage applied using three different color variations. FIG. 8D shows composite images of a virtual lipstick product with a matte finish and full coverage applied using three different color variations. FIG. 8E shows composite images of a virtual lipstick product with a gloss finish and sheer coverage applied using three different color variations. FIG. 8F shows composite images of a virtual lipstick product with a glitter finish and medium coverage applied using three different color variations. FIG. 8G shows composite images of a virtual lipstick product with a satin finish and medium coverage applied using three different color variations. FIG. 8G shows composite images of a virtual eyeshadow product with a shimmer finish and medium coverage applied using three different color variations. FIG. 8I shows composite images of a virtual eyeshadow product with a glitter finish and hi coverage applied using three different color variations.

Applying Virtual Makeup Products

Figure 4:
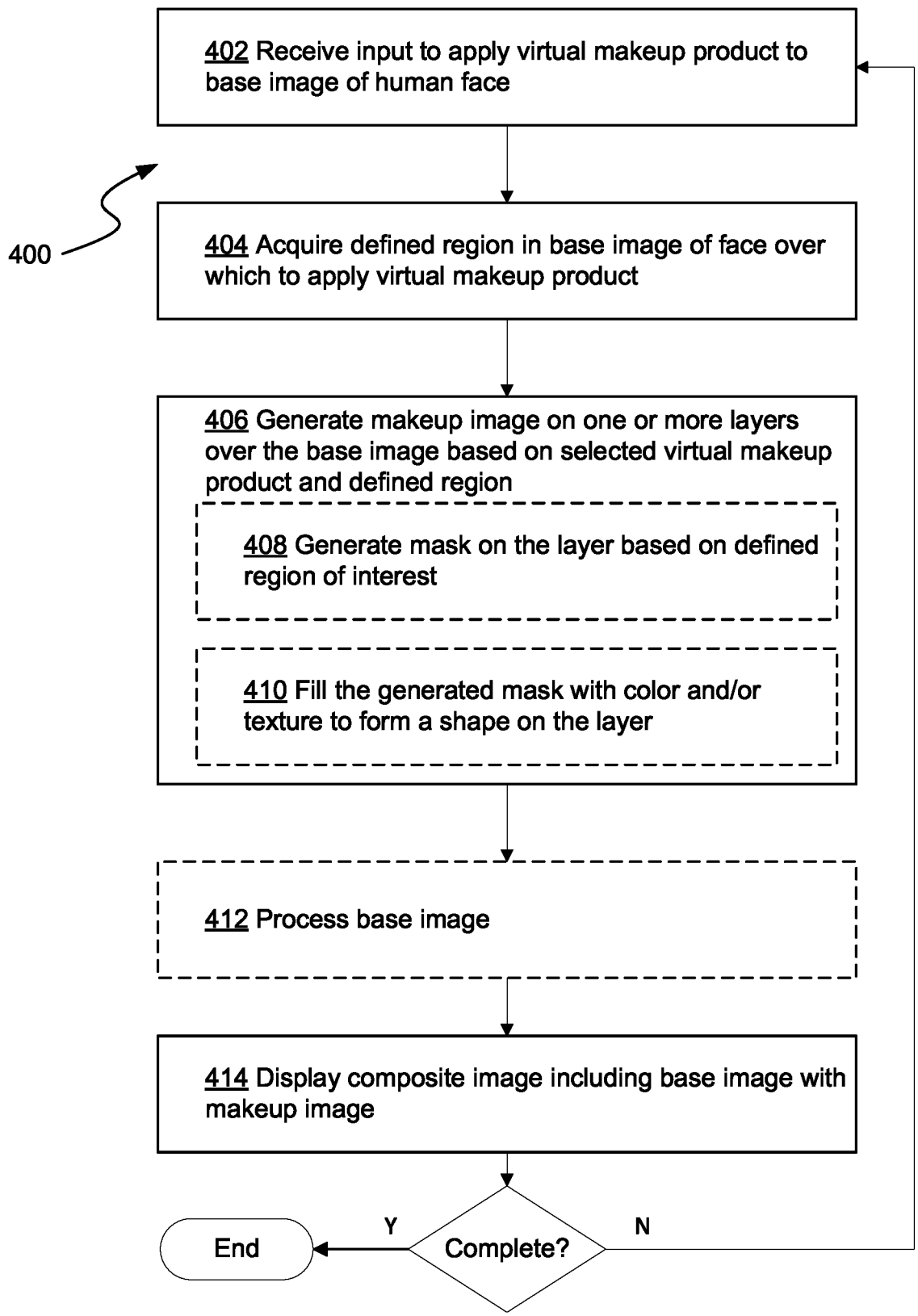
FIG. 4 is a flow chart illustrating an example process for applying a virtual makeup product using the virtual makeup platform described with respect to FIGS. 2A-2B.

FIG. 4 is a flow chart describing an example process 400 for applying a virtual makeup product using virtual makeup platform 120. As shown in FIG. 4, process 400 begins at step 402 with receiving a user input to apply a virtual makeup product. For example, a base image of a human (specifically a human face) may be displayed to a user via an interface 104 of a device 102. The user may select a virtual makeup product (e.g., virtual lipstick) to apply to over the base image and may provide the input to apply the virtual makeup product, for example by pressing a button, touching the display, etc.

In some embodiments, at step 404 a defined region of interest is acquired to facilitate the application of the virtual makeup product. Note that in some embodiments, step 404 may be performed before step 402. As previously mentioned the region of interest may be defined based on a user input and/or automated facial feature detection.

At step 406 in response to the user input requesting to apply the virtual makeup product, a makeup image is generated on one or more layers over the base image based on the selected virtual makeup product. The process of generating the makeup image may involve at step 408 generating masks in the one or more layers and at step 410 applying an image process (e.g., color fill, texture, blur, etc.) within the boundaries of the mask to form one or more overlaid shapes. As previously discussed, the boundaries of the mask may be user defined and/or based on an automatic feature detection process. Note that in some embodiments, the masks drawn on each layer for a given application of product may be different from each other depending on the defined effect. The layers forming the makeup image may be composited (i.e., overlapped) according to one or more blend modes defined for the given effect. For example, a given effect may include mask operations on four layers (A, B, C, and D) overlaid on the base image. The composed set of masked shapes on the multiple layers for a given application of virtual makeup product can be collectively referred to as a makeup image. However, each shape may similarly be described as a makeup image, meaning that the composite image resulting from the application of a virtual makeup product to a base image would include the base image as well as multiple layered "makeup images."

At step 412 in response to the user input requesting to apply the virtual makeup product, an image process may optionally be applied to the base image itself. In other words the base image may be altered to, for example, adjust lighting or clear imperfections.

At step 414, a composite image including the base image and one or more makeup images is generated and displayed via a graphical interface of a client device.

In an embodiment, process 400 is performed in response to each user input requesting to apply a virtual makeup product. For example, a user may select a virtual lipstick product to apply to the lips of a human face depicted in a base image. Process 400 is then performed to apply the virtual lipstick product to the base image resulting in a composite image including the base image and one or more makeup images that together simulate the application of the corresponding real-world makeup product. The user then selects a virtual eyeshadow product. Process 400 is then reapplied to generate one or more additional makeup images that simulate the application of the corresponding real-world eyeshadow product.

In some embodiments, the user input requesting application of a virtual makeup product can be received via a touch screen display device as a touch gesture. Accordingly, in such embodiments, acquiring the region at step 404 may include defining a stroke region based on a certain number of pixels around the detected touch area. For example, if a user touches the touch screen display, a stroke region may be defined that includes a shape (e.g., a circle or rectangle) that is a set diameter (or length) from a determined center point of the touch. Similarly, as the user drags their finger across the screen the stroke region is defined based on the length and shape of the user's gesture. In other words, the user inputs a brush stroke that defines, or at least, informs, the region of over which the virtual makeup is applied. The aforementioned mask operations are then based on the defined stroke region resulting in makeup image and composite image that shows, for example in real time the application of the virtual makeup product. In this way, a user can apply, for example a virtual lipstick product, in much the same way that the real product is applied. Different virtual products will have different alpha blend modes, sizes, and shapes of strokes. For example, lipstick may have a relative stroke size (i.e., pixel diameter) as compared to blush or powder. Further certain products that are darker such as eyeshadow may have be more transparent (lower alpha) than lighter products such as lipstick because they are generally applied in real life more softly. Table 1 below lists some example alpha blend mode and stroke region size configurations that can be set for different makeup product types.

TABLE 1

Example Stroke Region Configurations
for Different Makeup Product Types

| Makeup Product Type | Alpha (Dark, Medium, Light) | Size (Width, Height) (pixels) |
| --- | --- | --- |
| Blush | 15, 20, 25 | 128, 128 |
| Eyeliner | 15, 15, 15 | 40, 64 |
| Eyeshadow | 2, 2, 2 | 100, 70 |
| Eyelashes | 15, 15, 15 | 40, 64 |
| Eyebrows | 15, 20, 15 | 44, 44 |
| Lipstick | 18, 24, 30 | 64, 64 |
| Gloss | 15, 20, 25 | 64, 64 |

The above example configurations for different makeup product types are provided for illustrative purposes and are not to be construed as limiting. In some embodiments, the maximum alpha value that the image can take may be defined by the configuration of the selected product. In some cases, it may take the user swiping their finger more than once to get to the maximum alpha value since each stroke may have a certain defined alpha value.

The base images can vary depending on previous applied products. For example, in some cases a user may wish to apply a first product (e.g., a first lipstick), and then blend that first product with a second product (e.g., second lipstick of a different shade). In an embodiment, an initial base image (e.g., of a human face) is acquired. A user selects a virtual makeup product (e.g., a virtual lipstick) and swipes (e.g., via a touch screen display) over the lips one or more times. The virtual makeup product is thereby applied resulting in a first makeup image overlaid on the initial base image. The user then selects a second virtual makeup product (e.g., second lipstick of a different shade). The composition of the initial base image and the first makeup image is then redefined as a new base image. A second makeup image is generated (e.g., in response to one or more user swipes) based on application of the second makeup product. A crop of the new base image is generated using the portion of the second makeup image overlaying the first makeup image. Accordingly, the second makeup image is applied such that the resulting composite image simulates the blending of two or more virtual makeup products. In other words as a user swipes over the displayed composite image, the system crops and pastes a new makeup image over and over again, resulting in the summation of alpha values to a maximum (i.e., opaque) value. In some cases, a pressure sensitive input device may be implemented. In such embodiments, the alpha value for any given makeup image (or individual layers in the makeup image) may be based on both the configured virtual makeup product as well as the detected force applied via the input.

The aforementioned process of applying a virtual makeup product has been described in the context of application over a single two dimensional (2D) digital image, however this description is for illustrative purposes and should not be construed as limiting. For example, given sufficient processing capabilities, the described techniques may also be applied to a series of image frames that form a video. For example, an embodiment is contemplated in which transparent layers are composed over a displayed base video wherein generated makeup images rendered in the transparent layer(s) over the base video are continually updated to track the motion (i.e., orientation and/or position) of a subject captured in the video. In an augmented reality (AR) context, makeup images may be generated and displayed (with or without displaying base image(s)) via an AR display to track a subject in a field of view of the AR display. In a three dimensional (3D) context (still image or video), makeup images may be generated and composited with base images captured at different vantage points (i.e., stereoscopic image capture).

Facial Feature Detection

Figure 5:
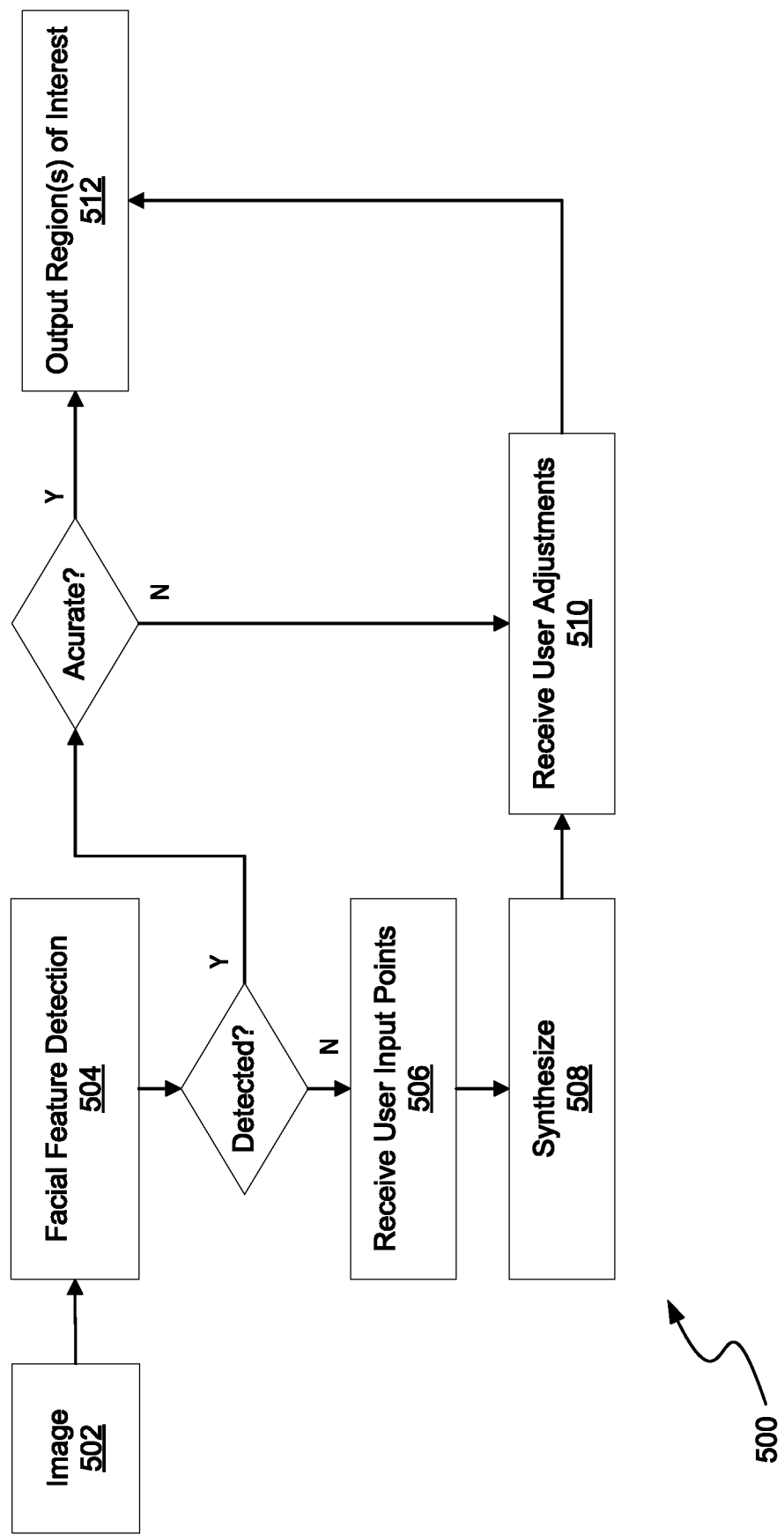
FIG. 5 is a flow chart illustrating an example process for facial feature detection using the virtual makeup platform described with respect to FIGS. 2A-2B.

FIG. 5 is a flow chart describing an example process 500 for acquiring regions of interest from a base image, for example, of a human face. As shown in FIG. 5, process 500 begins with acquiring a base image 502. At step 504, a facial feature detection process is applied to automatically detect the face and/or specific features of the face. For example, STASM is an open source software package that can be utilized to return certain landmarks in a face based on a digital image or video. Similarly, Flandmark is another open source package that may be utilized for performing automated facial feature detection. A person having ordinary skill will recognize that these are two examples of facial feature detection resources that may utilized and are not intended to be limiting. In certain embodiments, image pre-processing may be applied to aid in the facial feature detection process. For example, segmenting color data in the image, gray scaling the image, equalizing histogram levels, applying Gaussian blurring, applying morphology, etc.

If the facial features are detected and accurate, process 500 continues to step 512 where data associated with the detected facial features (i.e., region(s) of interest) is output for use in applying virtual makeup effects. In some embodiments, the accuracy of the detected facial features may be determined based on a user input indicative of a confirmation that the detected features are accurate.

As shown in FIG. 5, if after performing an initial feature detection process at step 504, features are not successfully detected or are not confirmed to be accurate, process 500 may continue to steps 506 and/or 510 with prompting and receiving user to input points defining and/or refining feature locations. For example, in some embodiments in some embodiments, a user may be prompted (e.g., via a graphical user interface) at step 506 to define certain key features using control points such as an outline of the face, and the general locations of the eyes, mouth, and nose. These key feature points can then be used by a facial feature detection process to perform image processing to detect features at a synthesis step 508. In an embodiment, a user may be prompted to enter five key feature points beyond the boundary of the face: the locations of the two eyes, the nose, and two points generally defining the location and length of the mouth. Alternatively, in some embodiments, if facial features are not successfully detected at step 504, a user may be prompted to use a different base image.

Figure 6:
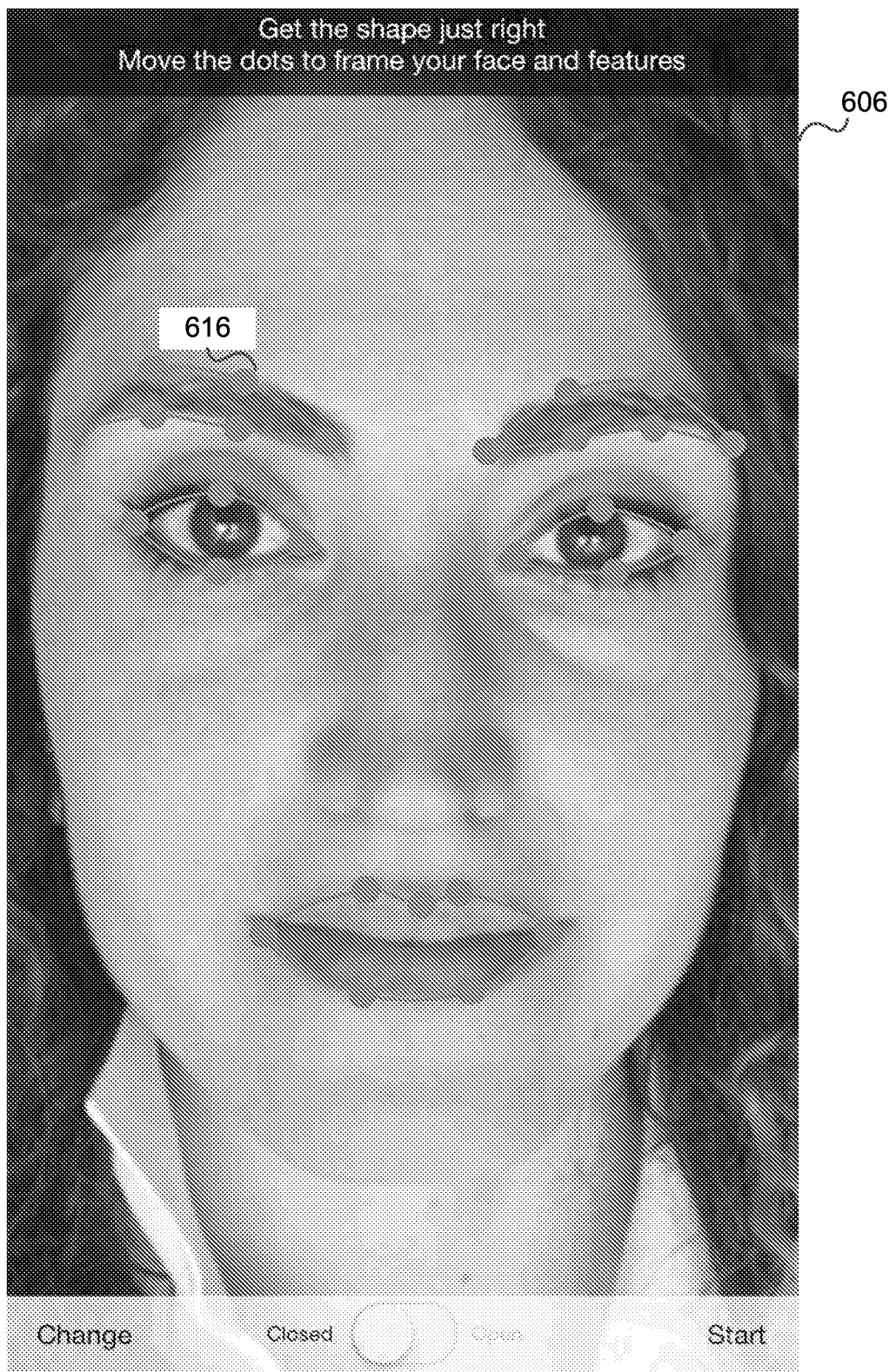
FIG. 6 shows a screen capture of an example graphical interface through which a user may adjust region boundaries to aid in the facial feature detection process described with respect to FIG. 5.

In some embodiments, following the initial facial feature detection process at step 504, a user may be presented with an option at step 510 to provide refining adjustments. For example, FIG. 6 shows a screen capture of an example graphical interface 606 through which a user may adjust region boundaries following facial feature detection. In some embodiments, these interface features may be part of a virtual makeup application instantiated at a client device 102. As shown in FIG. 6, a base image (e.g., of a human face) is displayed to a user at via interface 606. One or more user adjustable control points 616 are then overlaid over the base image to allow a user to define or refine the boundaries of the face as a whole and/or specific regions of the face. As shown in FIG. 6, the control points may be connected by lines to form a defined border. In general, these border lines may be formed as bezier curves connecting the control points 616.

Figure 7A:
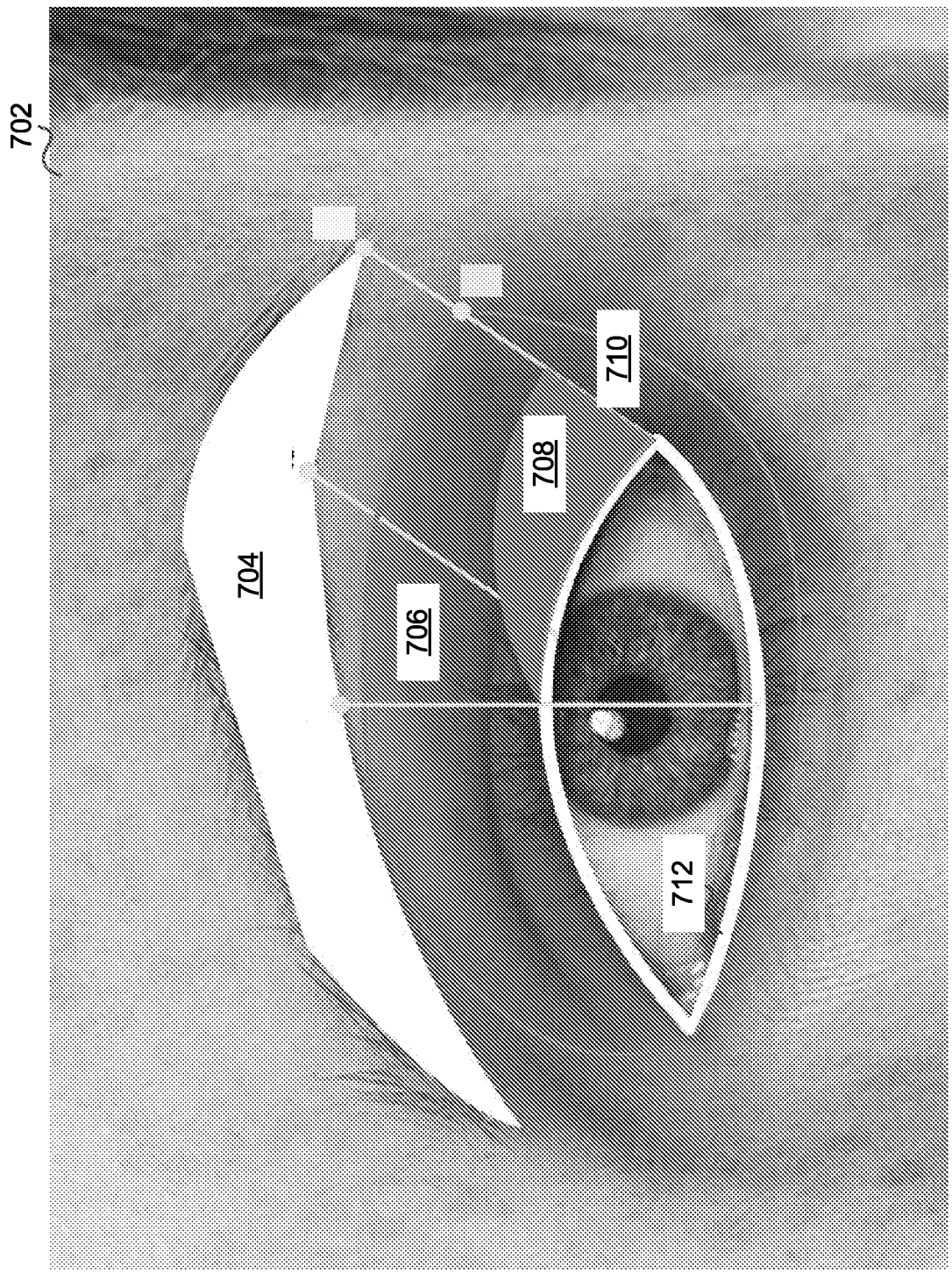
FIG. 7A shows example regions of interest in a face that may be defined based on the facial feature detection process described with respect to FIG. 5.

FIG. 7A shows an example set of regions of interest that may be defined based on the previously described feature detection process. The example in FIG. 7A shows various regions around an eye depicted in base image 702. For example, the various regions may include an eyebrow 704 where certain virtual makeup products such as virtual mascara, or virtual eyebrow pencil may be applied. The regions may also include various regions and sub regions 706-712 of the skin surrounding the eye were certain virtual makeup products may be applied. For example, regions 706-710 may be configured to receive virtual eyeshadow while region 712 may be configured to receive virtual eyeliner product. Recall that the effects associated with each virtual makeup product may depend on the region of the face in which the product is being applied. For example, certain information on the three dimensional curvature of the face may be implied based on the defined region boundaries. Without fully modeling the face in three dimensions, curvature lines may be defined that dictate how some filters are applied. For example, consider a virtual eyeshadow product with glitter. When the virtual product is applied, the glitter specs in the generated makeup image may follow a distribution pattern (i.e., a non-uniform distribution pattern) that approximates application of the real world product over contours of the face.

Figure 7B:
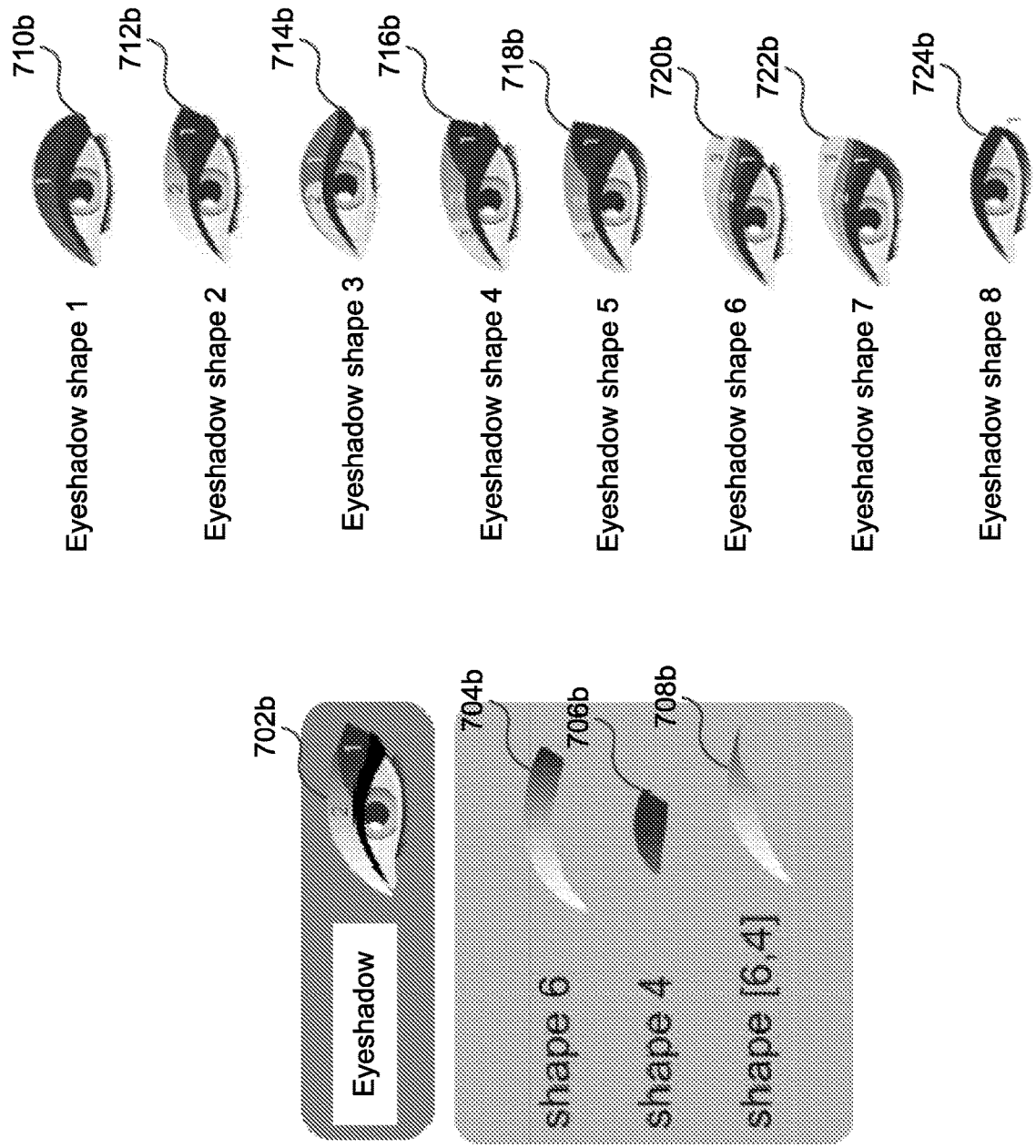
FIG. 7B shows example combinations of makeup image shapes that may be based in part on the regions of interest in a face depicted in FIG. 7A.

In some embodiments, application of a virtual makeup product in particular regions of a face can include multiple composed shapes that form the makeup image. FIG. 7B illustrates how shapes (e.g., based on one or more masked filters) can be combined to form a makeup image to overlay in a particular region of a face depicted in a base image. For example, as shown in FIG. 7B, a makeup image shape 702b based on the application of a virtual eyeshadow product may be composed of multiple shapes 704b, 706b, 708b. Each of the shapes 704b, 706b, 708b may include one or more masked filters with mask boundaries based on the detected/ defined region boundaries for eyes depicted in a base image (see e.g., FIG. 7A). Further, the combination of shapes forming makeup image shape 702b are just an example provided for illustrative purposes. Alternative combinations 710b-724b illustrate how alternative shapes can be arranged to produce different looks when applied to a base image. Again, the particular shapes may be based on actual facial region boundaries detected in the base image. In an embodiment, a user may be presented with one or more predefined makeup application options (e.g., based on shape combinations 710b-724b) with which to apply a selected one or more virtual makeup products.

The previously described process for facial feature detection was provided for illustrative purposes, however a person having ordinary skill will appreciate than any number of other process for facial feature detection may be applied. For example, depending on the device, some cameras may include built in facial feature detection capabilities and may perform one or more of the previously described steps.

Example User Interfaces for Virtual Makeup Application

FIGS. 9A-9L show a series of screen captures of an example graphical user interface for virtual makeup application. The example graphical interface may be displayed to a user of a client device 102 via a website or an virtual makeup application instantiated at the client device. As previously discussed, in some embodiments, rendering of interface elements and/or composite images may occur at a remote host server device operating as part of a cloud-based virtual makeup platform 120. In some embodiments, the virtual makeup application at the client device 102 may perform the rendering of interface elements and/or composite images based on virtual makeup configurations received from a remote host server.

Figure 9A:
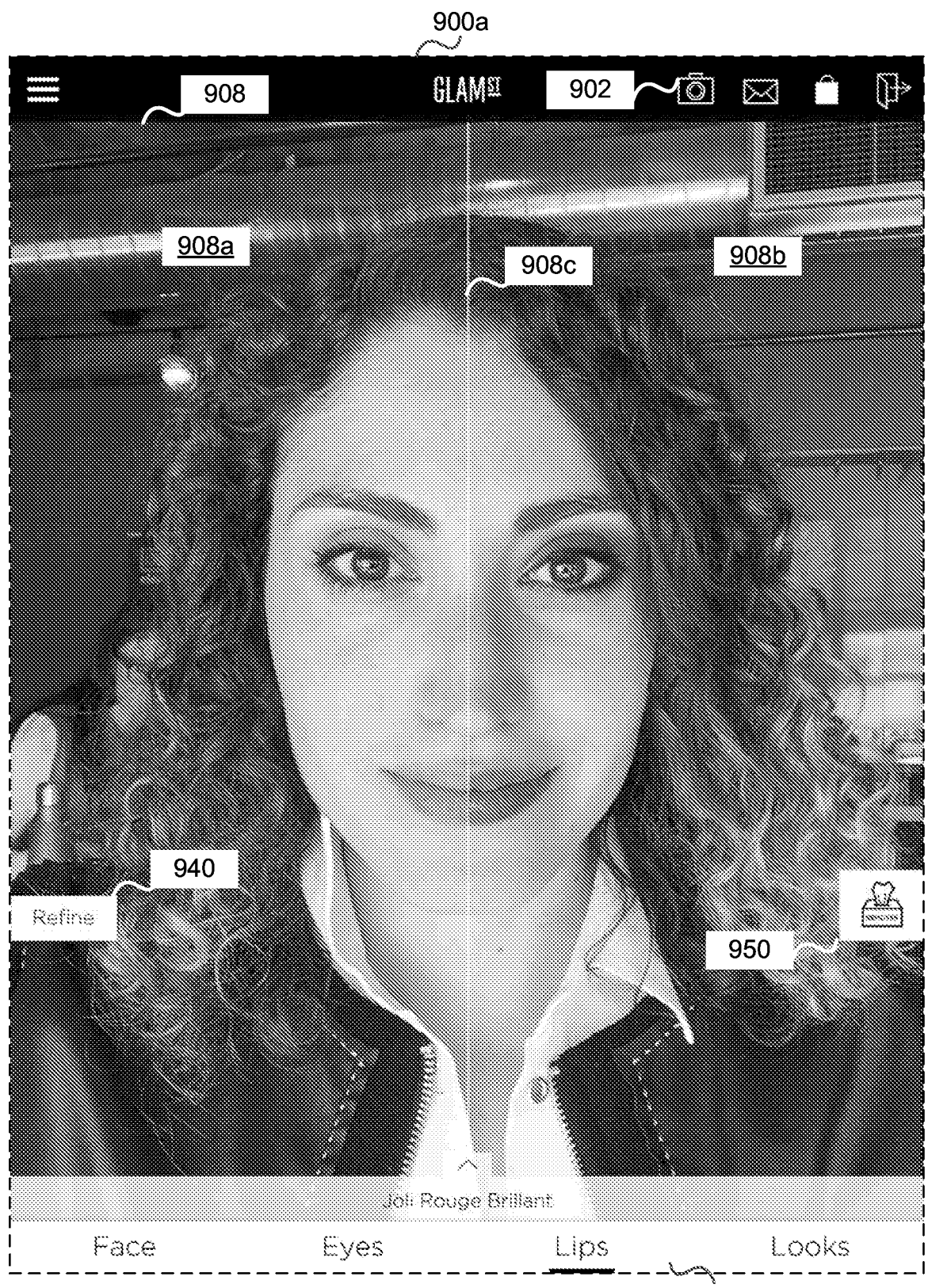
FIGS. 9A-9L show a series of screen captures of an example graphical user interface for virtual makeup application.

FIG. 9A shows an example screen capture 900a of the example graphical user interface. As shown in screen capture 900a, the interface may include an option 902 (e.g., in the form of a button) that enables a user to load an image for use as the base image. In some embodiments option 902 enables a user to upload an image from a local storage (e.g., at a client device 102) to a remote server (e.g., operating as part of platform 120) for processing. In other embodiments, where all processing occurs locally at client device 102, option 902 may enable a user to load an image from local storage for processing at the client device.

Figure 9B:
Figure 9C:
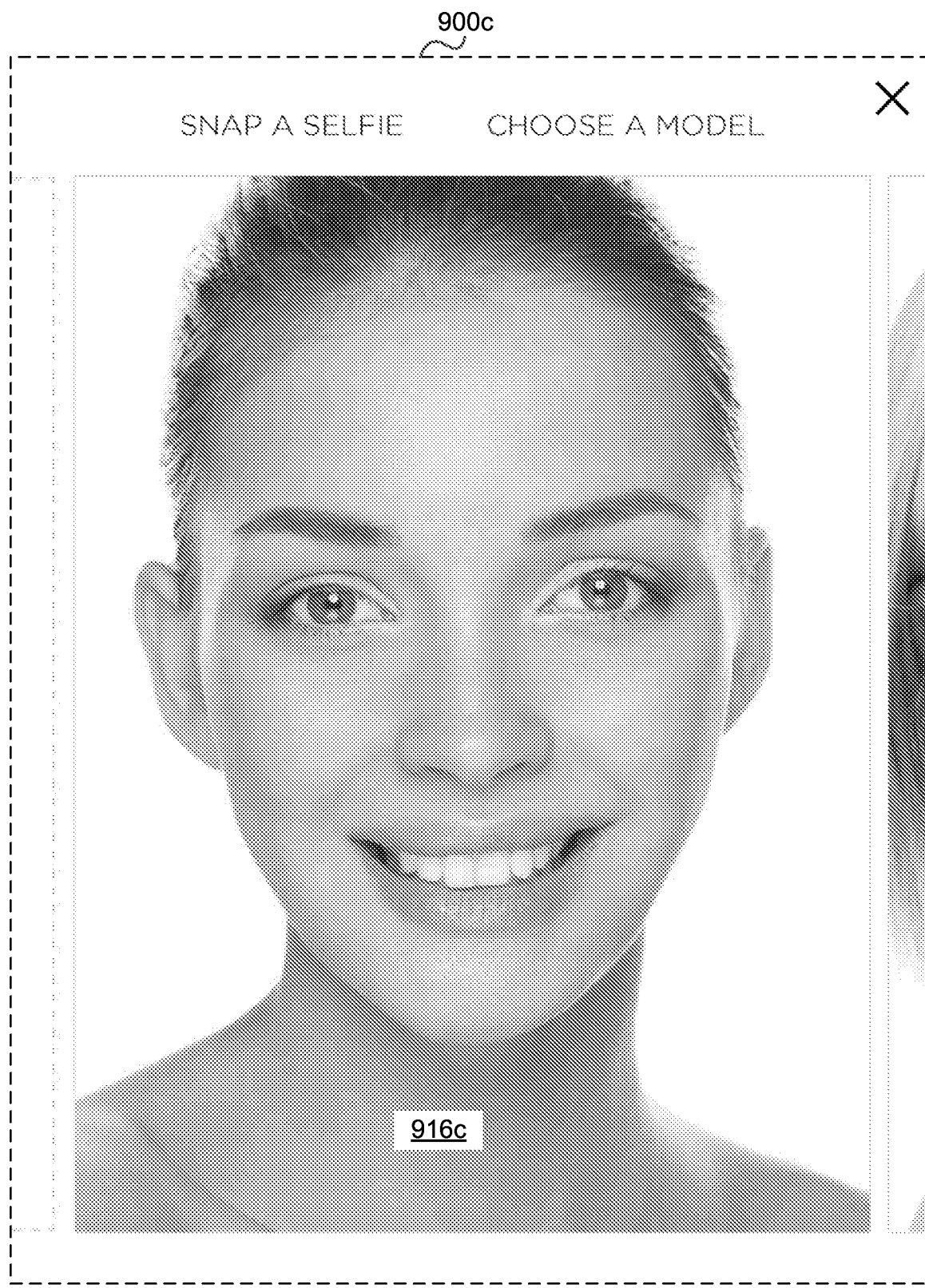
Figure 9D:
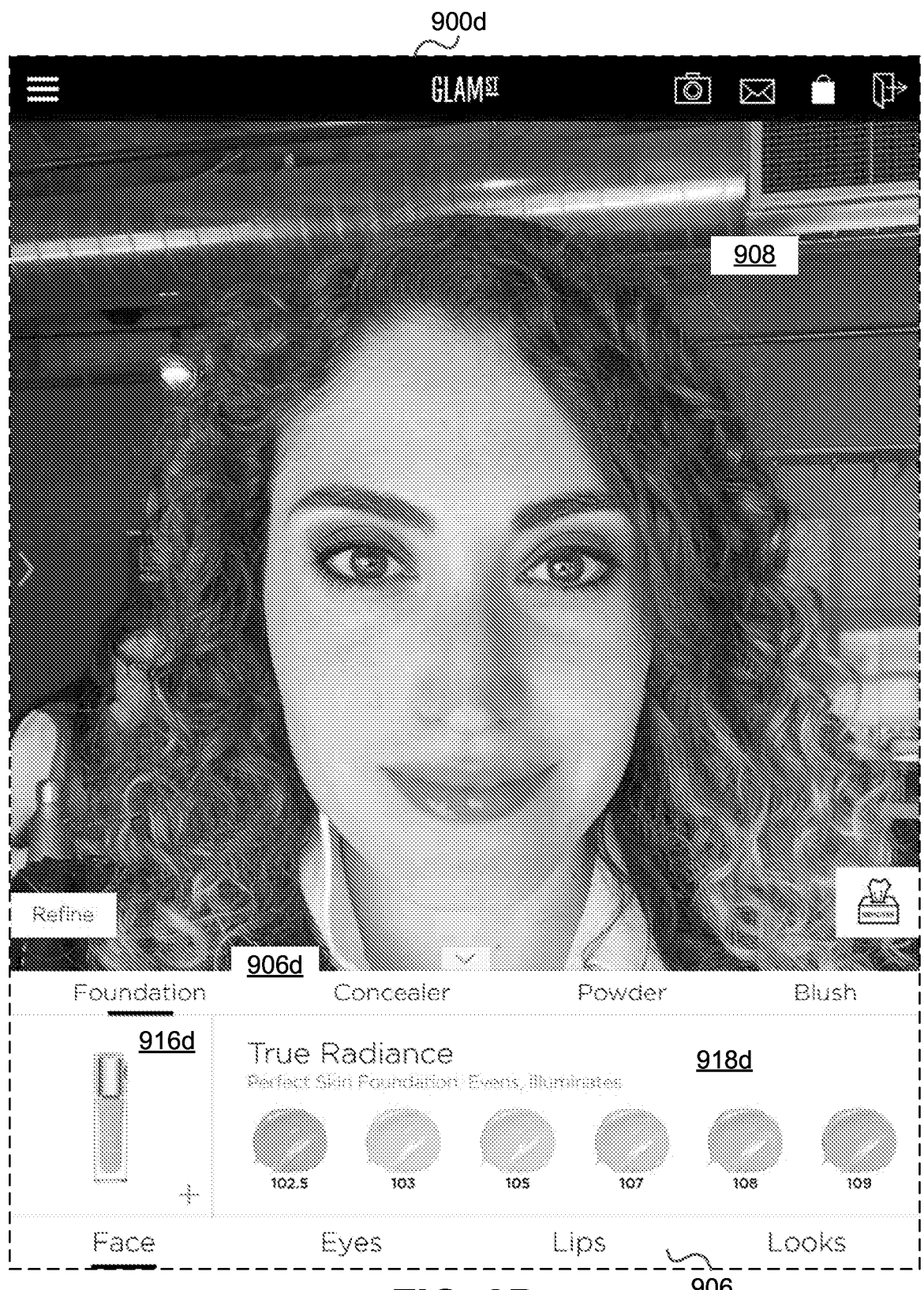

In some embodiments, in response to selecting option 902, the user may be presented with screen 900b in FIG. 9B that includes an option 912b to "snap a selfie" and option 914b to "choose a model." In an embodiment, in response to selecting option 912b a user may be allowed to capture an image via an image capture device associated with the client device 102. For example in response to selecting option 912b, a separate or integrated photo capture application may open allowing the user to take a picture of themselves or another person. In response to selecting option 914b, a user may be presented with a menu 916c (e.g., as shown at screen 900c in FIG. 9C) to select a locally or remotely stored image for use as the base image. For example the selected image may be from the user's own photo library or from data store including user-selectable images of models. As shown in screen capture 900c in FIG. 9C, the menu 916c may include a series of images of models that the user may browse, for example, by inputting swipe gestures via a touch screen display of client device 102.

Returning to FIG. 9A, in some embodiments, the graphical user interface may also include one or more product selection menus 906 enabling a user to filter available virtual makeup products according to various filters such as manufacturer/designer, and regions of the face, and product types. For example, in response to selecting the "face" region via menu 906, a user may be presented with screen 900d shown in FIG. 9D that includes a secondary menu 906d through which a user can select a particular virtual makeup product type for the "face region." In the example screen 900d of FIG. 9D, a user has selected "foundation" via menu 906d and is presented with a graphical menu 916d showing at least one virtual foundation product or product line. As shown in screen 900d, the user may also be presented with a second graphical menu 918d including an option to select various specific products from the product line. For example, as shown in screen 900d of FIG. 9D, menu 918d includes an option to select from a range of colors, shades, etc. in a particular line of foundation products.

Figure 9E:
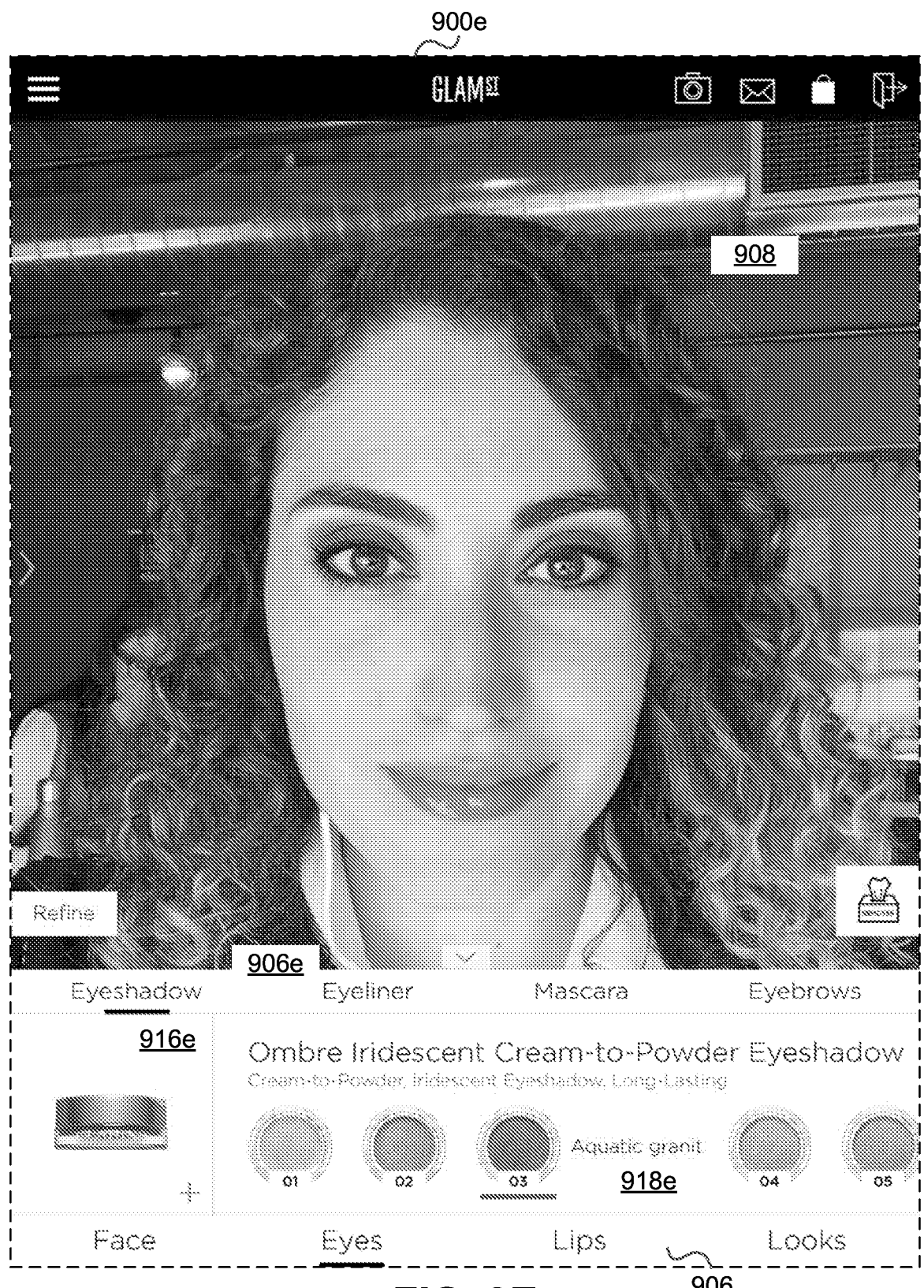
Figure 9F:
Figure 9G:
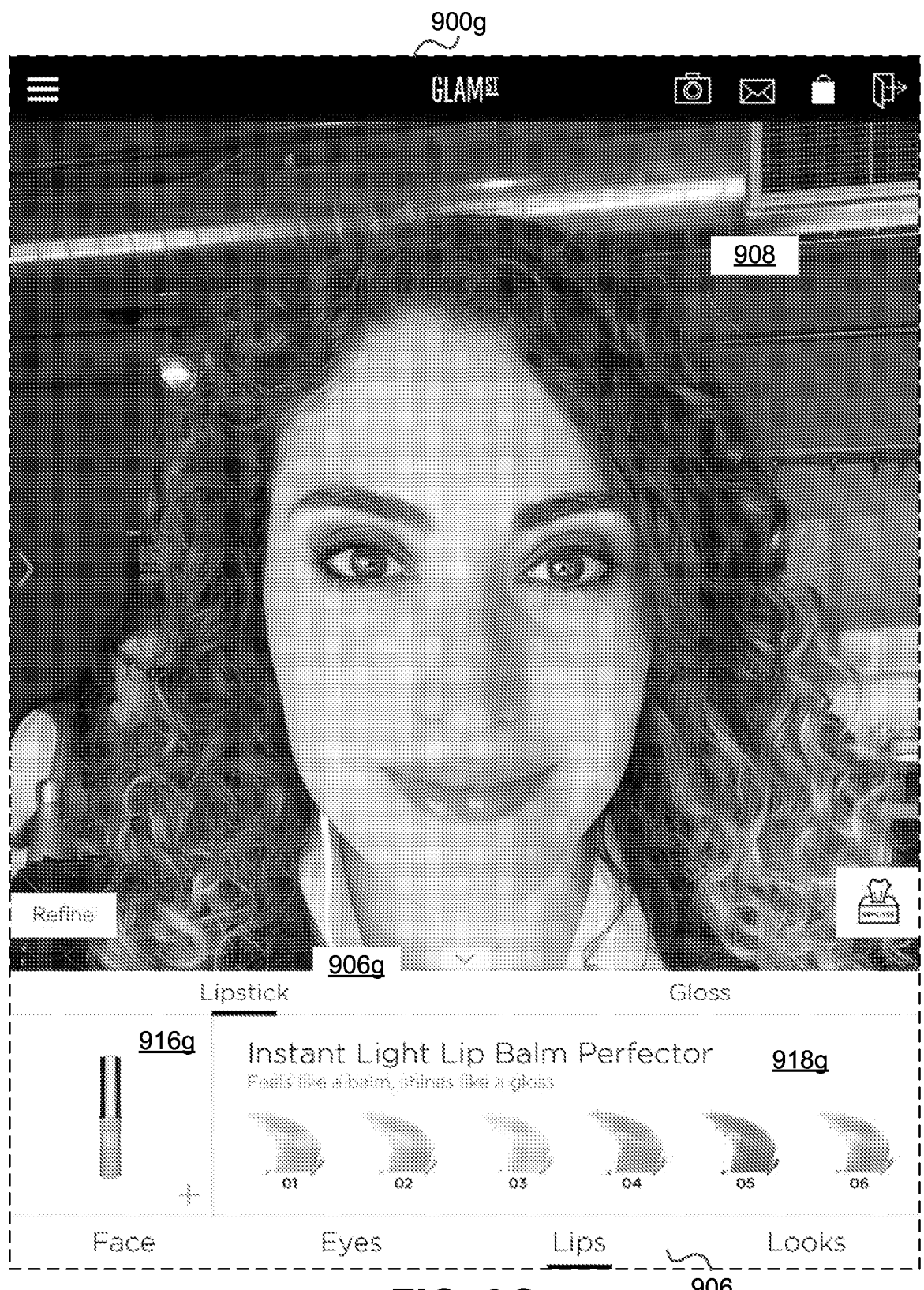

Similarly, as shown at screen capture 900e in FIG. 9E a user has selected "eyes" via menu 906 and "eyeshadow" via menu 906e. In response the user is presented with a graphical element 916e showing at least one virtual eyeshadow product or product line and graphical menu 918e including an option to select from a range of colors for a particular line of eyeshadow products. In some embodiments a virtual makeup product may include varying characteristics. For example, as shown at screen 900f in FIG. 9F, menu 916f shows a selected virtual makeup product that includes a pallet of five colors. Accordingly, a user is presented with menu 918f through which they can select from the available colors in the palette to apply virtually. As another example, as shown at screen capture 900g in FIG. 9G a user has selected "lips" via menu 906 and "lipstick" via menu 906g. In response the user is presented with a graphical element 916g showing at least one virtual lipstick product or product line and graphical menu 918g including an option to select from a range of colors for a particular line of lipstick products.

Figure 9H:

Returning to FIG. 9A, the graphical user interface may also include an option 940 to refine or filter available virtual makeup products to aid in selection via the selection menus (e.g., menu 906). For example, in response to a user selection option 904 they may be presented with screen 900h shown at FIG. 9H which includes a refinement menu 942h. As shown in FIG. 9H, refinement menu 942h may include one or more options to refine or filter a list of available makeup products according to various characteristics (e.g., finish, coverage, texture, benefit, etc.).

Returning to FIG. 9A, in response to receiving a makeup product selection (e.g., menu 906 and associated submenus) and a request to apply the selected product, a composite image 908 including a base image (e.g., of a human face) and a makeup image based on the selected product may be displayed to the user via the graphical user interface. For example, as shown at screen 900a an image 908 may be displayed as two parts: a before image 908a including the base image without the applied virtual makeup product and an after image 908b showing the composite of the makeup product applied to the base image. Images 908a and 908b may be separated by a dividing line 908c that may be adjusted in response to user input to sweep over image 908 thereby changing the relative sizes of images 908a and 908b.

As previously mentioned, in some embodiments, the request to apply the makeup product is received as a touch gesture via a touch screen display of a client device 102. In other words, a user may apply a selected product to the base image of 908 by touching and moving their finger across the screen over the base image.

If the user does not like the selected makeup product as applied or wishes to try a different makeup product they can elect to remove the applied makeup product for example by selecting "remover" option 950. In some embodiments, remover option 950 may act as a reset button, for example removing all or some of the makeup images form composite image 908 in response to a user selection. In other embodiments, in response to selection option 950, a user may access an interactive remover tool, which similar to an eraser tool in photo editing applications, they can use to finely remove specific areas of virtually applied makeup product (e.g., using touch gestures via a touch screen display of client device 102).

Figure 9I:

FIG. 9I shows a screen capture 900i of the example graphical user interface showing selectable "Looks" via a graphical menu 916i, displayed in response to a user input selecting the "Looks" category via menu 906. For example, as shown in FIG. 9I, in response to a user selecting the "Looks" category in menu 906, menu 916i is displayed showing screen captures of models displaying various predefined "looks." Recall that a "look" in this context is a particular combination of two or more makeup products (e.g., a lipstick product combined with a mascara product). In an embodiment, the "looks" displayed via menu 916i may be configured by any of the makeup manufacturer/designer, a makeup retailer, a makeup artist, or any other user of virtual makeup platform 120. For example in some embodiments, end users can configure their own custom looks (e.g., by selecting various combinations of makeup products) and can submit their custom looks to virtual makeup platform 120.

In some embodiments, the looks displayed via menu 916i may include user-specific recommendations for combinations of makeup products. For example, a user may load an image of their face (e.g., via option 902). The loaded image may be analyzed by platform 120 (e.g., by using the previously described feature detection processes and/or any other computer vision processes) to determine certain characteristics of the face depicted in the loaded image. For example, analysis performed on the image may detect a general shape of the face, shapes and arrangement of certain key features (e.g., eyes, nose, mouth, etc.), hair color and texture, and skin tone. Based on the detected characteristics, platform 120 may generate one or more recommended looks that are specifically tailored to the characteristics of the face in the loaded image. In some embodiments, product recommendations may be based on a user-specific product browsing or selection history. For example, the system may recommend a look that includes a makeup product previously selected by the user.

Product recommendations may be based on objective and or subjective "rules" such as general color combination rules (e.g., primary vs. secondary color combinations), specific application rules (e.g., product combinations for daytime vs. nighttime usage), makeup effects and predetermined goals (e.g., applying bronzer to define or sculpt certain facial features), etc. In some embodiments, these rules may be generated by one or more expert makeup artists, manufacturers/designers, retailers, etc. For example, in an embodiment, retailer (such as a department store) may individually define certain makeup recommendation rules to generate looks that are selectable via menu 916i. Alternatively or in addition, individual makeup artists or designers may define their own recommendation rules to automatically generate user selectable looks via menu 916i. In some embodiments, look recommendations may be automatically generated using machine-learning based models, for example based on historical aesthetic feedback data. For example, although not shown in screen 900i, in some embodiments, users may be presented with options to rate makeup products and looks, both in general and as applied to their specific facial features.

Figure 9J:

FIG. 9J shows a screen capture 900j of example the graphical user interface displayed in a response to a user selection of a particular look via menu 916i shown in FIG. 9I. As shown in FIG. 9J, in response to a user selection of a particular look, a menu 918j is displayed showing the user selectable makeup products that are included in the selected look. Using menu 918j, a user can select and apply the virtual makeup products, for example, as previously described.

Figure 9K:

FIG. 9K shows a screen capture 900k of example graphical user interface showing stocking information regarding virtual makeup products. As previously mentioned, a virtual makeup platform 120 may operate as, part of, or in communication with an e-commerce platform through which a user can order the real world makeup products associated with the virtual products they try on via the app. Similarly, the aforementioned features may be provided via an instore kiosk device at a "brick and mortar" retail store and may be communicatively coupled to an inventory system associated with the store. As shown in FIG. 9K, screen 900k may provide information to a user regarding stock availability of various real world makeup products.

Figure 9L:

FIG. 9L shows a screen capture 900l of an example graphical user interface similar to the interface depicted in FIGS. 9A-9K but with brand specific labeling. As previously mentioned, in some embodiments various features associated with virtual makeup platform 120 may be provided as a "white label" product to makeup designers, manufacturers, or vendors. For example, as shown in FIG. 9L, the graphical interface depicted in screen 900l may be provided via a "white label" virtual makeup application offered by a makeup vendor such as Clarins™.

Various example interface features have been described with respect to FIGS. 9A-9L for illustrative purposes and are not to be construed as limiting. Other graphical user interfaces may include fewer or more interface features and may arrange interface features differently, while remaining within the scope of the presently described innovations.

Virtual Makeup Product Configuration and Calibration

Figure 10:
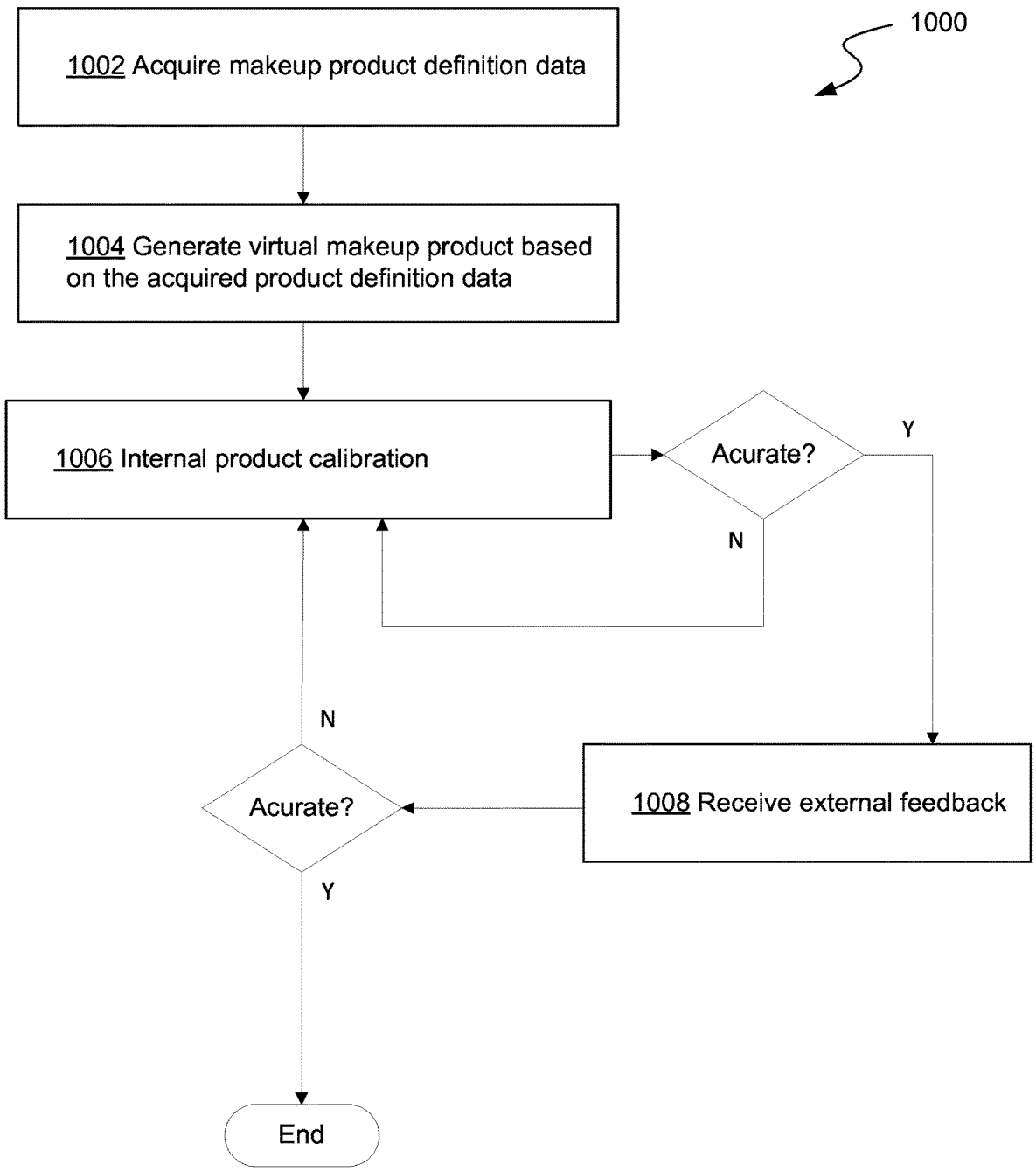
FIG. 10 is a flow chart describing an example process for generating a virtual makeup product for use with virtual makeup platform of FIGS. 2A-2B.

FIG. 10 is a flow chart describing an example process 1000 for generating a virtual makeup product for use with virtual makeup platform 120. As shown in FIG. 10, process 1000 begins at step 1002 with acquiring makeup product definition data. In other words, acquiring data associated with the characteristics of a real world makeup product. For example, to facilitate generating a virtual makeup product, a provider of a virtual makeup platform 120 may solicit or pull data on a counterpart real world makeup product (e.g., from a manufacturer, designer, or vendor of the real world makeup product). Product definition data can include any data pertaining to the real world product. For example product definition data can include strings defining any of a brand name, product name, product description, product type (e.g., lipstick, etc.), unique identifier (e.g., UPC, EAN, SKU code), color (e.g., name, hexadecimal code, etc.), palette (an array of colors), coverage (e.g., low, medium, high, etc.), finish (e.g., gloss, matte, etc.), shade (e.g., light, medium, dark, etc.), and facial region (e.g., lips, eyes, etc.). Product definition data may also include image data including any of images of the real world product, images of the color/shade/finish/texture (e.g., a color swatch) associated with the real world product, and brand logo graphics.

In some embodiments, the makeup product definition data is acquired by requesting the data from an entity associated with the real-world product (e.g., manufacturer, designer, vendor, etc.). For example a provided of the virtual makeup platform 120 may request data for a set number of pre-defined attributes (e.g., any of those described in the previous paragraph) to construct the product definition data. In some embodiments, acquiring the product definition data may include crawling a website or websites associated with the real-world makeup product (e.g., websites of manufacturers, designers, vendors, etc.) to automatically retrieve the data. In some embodiments, acquiring the product definition data may include analyzing a digital image of the real-world makeup product to automatically retrieve the data. For example, using image processing employing computer vision models, various attributes (e.g., color, shade, coverage, finish, region, etc.) of a makeup product may be estimated from a digital image of the product (e.g., an image of a person modeling the product, a marketing image of the product, a color swatch, etc.). In some embodiments acquiring the makeup product definition data may include acquiring a sample of a real world makeup product and generating the data based on the characteristics of the sample.

The product definition data may be acquired and stored in any data format. For example, the product definition data can be represented in any of an XML file, HTML file, or JSON object, or any other suitable data format. The following is an illustrative example set of product definition data in the form of a JSON object:

```
{
  "Id": "1527088",
  "Product name": "Powder Blush",
  "Images": {"Url": "http://products-image-url-1.jpg"},
  "Brand": {
    "Name": "name of brand",
    "Url": http://brands-image-url.jpg
  },
  "Barcode": "818399011602",
  "SKU": "95279785",
  "Palettes": {
    "Name": "Catalina",
    "Images": {"Url": "http://palettes-image-url-1.jpg"},
    "Shades": {
      "Color": "#f9cda0",
      "Coverage": "moderate",
      "Finish": "natural",
      "Regions": "blush"
    }
  }
}
```

The above described example representation of product definition data is provided for illustrative purposes and is not to be construed as limiting. As mentioned, product definition data may be represented in any format. Further, an actual set of product definition data may include fewer or more attributes than as shown in the example described above.

Process 1000 continues at step 1004 with generating a virtual makeup product based on the acquired product definition data. Recall that, in general, a virtual makeup product can be a combination of an effect with a configuration for the effect, wherein the effect is a combination of one or more layers filters (e.g., mask filters). In some embodiments, a virtual makeup platform 120 may include a set of predefined effects, each effects including a set of predefined layered filters (i.e., image processing effects). Accordingly, generating the virtual makeup product based on the product definition data may include interpreting the product definition data and selecting one or more of the predefined effects and configuring (i.e., setting configuration parameters) the one or more predefined effects. In general configuration of an effect may involve two main parts: 1) configuring the behavior of the one or more filters included in the effect (i.e., how mask filters are applied), and 2) configuring the layers of application for each filter (i.e., how layers are to be combined relative to one another. The predefined effects are configured such that when applied to generate a makeup image the resulting composition with a base image (e.g., of a human face) simulates the application of the counterpart real-world makeup product.

In some cases, this process of selecting and configuring the effect(s) for a given product may be performed automatically by a computer system associated with virtual makeup platform 120. For example, given a set of attributes included in the product definition data for a real-world makeup product (e.g., color, shade, coverage, finish, and facial region), a computer system may automatically select one or more predefined effects from a set of a multiple predefined effects that most closely approximate the provided attributes. In some embodiments, this process of selection and configuration of predefined effects may be guided by machine-learning based models. In some embodiments, a computer system may access a digital image of the real-world makeup product applied to a human face, interpret the image using a computer vision model, and optimize the selection and configuration of predefined effects by iteratively applying the effects to a reference base image until a composite image that closely approximates the image including the applied real-world makeup product.

In some embodiments, generating the virtual makeup product may include accessing a previously generated makeup product and reconfiguring any effects associated with the previously generated makeup product. For example generating a virtual makeup product for a new color of a previously generated makeup product may involve just reconfiguring a color parameter associated with the product.

Process 1000 continues at step 1006 with internally calibrating the generated virtual makeup product, for example, by adjusting the configuration parameters for an included effect and/or changing which effects are included. For example, in some embodiments, step 1006 may include a process of human quality assurance review to validate that the generated virtual makeup product accurately simulates its counterpart real-world makeup product when applied to a base image. In this context, internal quality assurance review may include review by the quality assurance team at a provider of the virtual makeup platform. Once the generated virtual makeup product is deemed accurate according to the internal quality assurance process, process 1000 continues to step 1008 with receiving external feedback, for example from end users or from entities associated with the design, manufacture, or sale of the real-world makeup product. For example, the previously described virtual makeup user interface may include options through which an end user may provide feedback on the accuracy of the virtual makeup product. This end user feedback can then be incorporated during further internal product calibration to improve the simulation accuracy of the virtual makeup product.

In some embodiments, step 1008 may involve soliciting feedback from an external reviewing entity such as the manufacturer, designer, or vendor of the real-world makeup product before releasing the generated virtual makeup product for use by end users. For example, as described below, feedback from entities associated with the design, manufacture, or sale of the counterpart real-world makeup product can be solicited and retrieved via a dedicated application or website accessible via a client device 102.

In some embodiments, step 1008 includes enabling access to the internally calibrated virtual makeup product to an external reviewing entity via a dedicated validation application that is separate from a client application through which end users will access the finalized product once approved. In other words, a generated virtual product may be set to or made accessible to a computer device executing the validation application after initial internal calibration is completed. Through the validation application, the reviewing entity can test the generated virtual makeup product, for example by applying the product to base images as in the consumer application. The validation application adds additional functionality, enabling the reviewing entity to approve, reject, and provide comments regarding a generated virtual makeup product. An example "validation app" with associated example graphical interface is described in more detail below.

If the generated virtual makeup product is rejected by the external reviewing entity at step 1008, process 1000 returns to step 1006 with additional internal calibration based on any comments provided and/or reasons for rejection. If the generated virtual makeup product is approved by the external reviewing entity at step 1008, process 1000 concludes and the virtual makeup product is placed in a production environment of virtual makeup platform 120 such that the product is accessible to end users via client devices 102.

Example User Interfaces for Virtual Makeup Validation Application

Figure 11A:
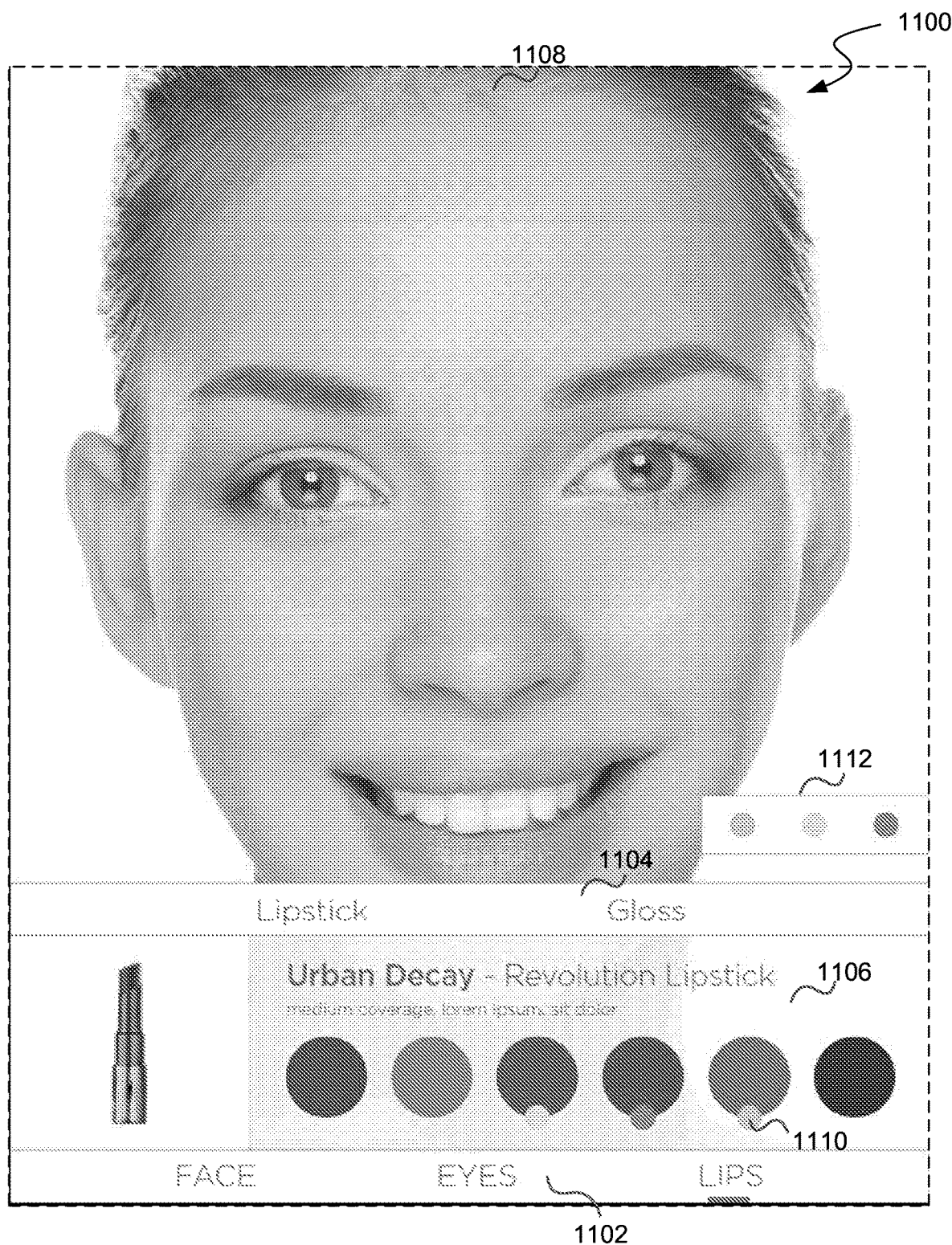
Figure 11B:
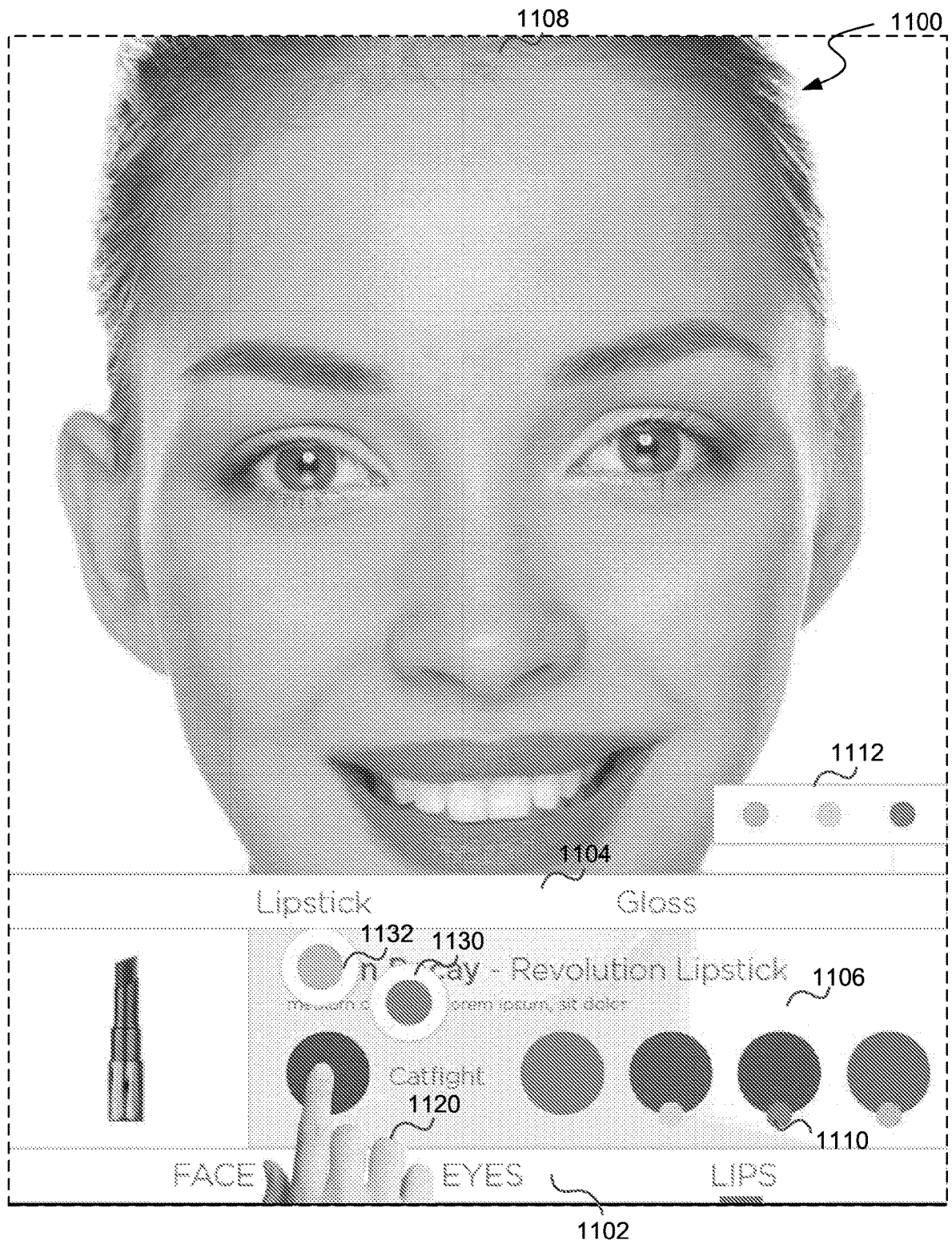
Figure 11C:
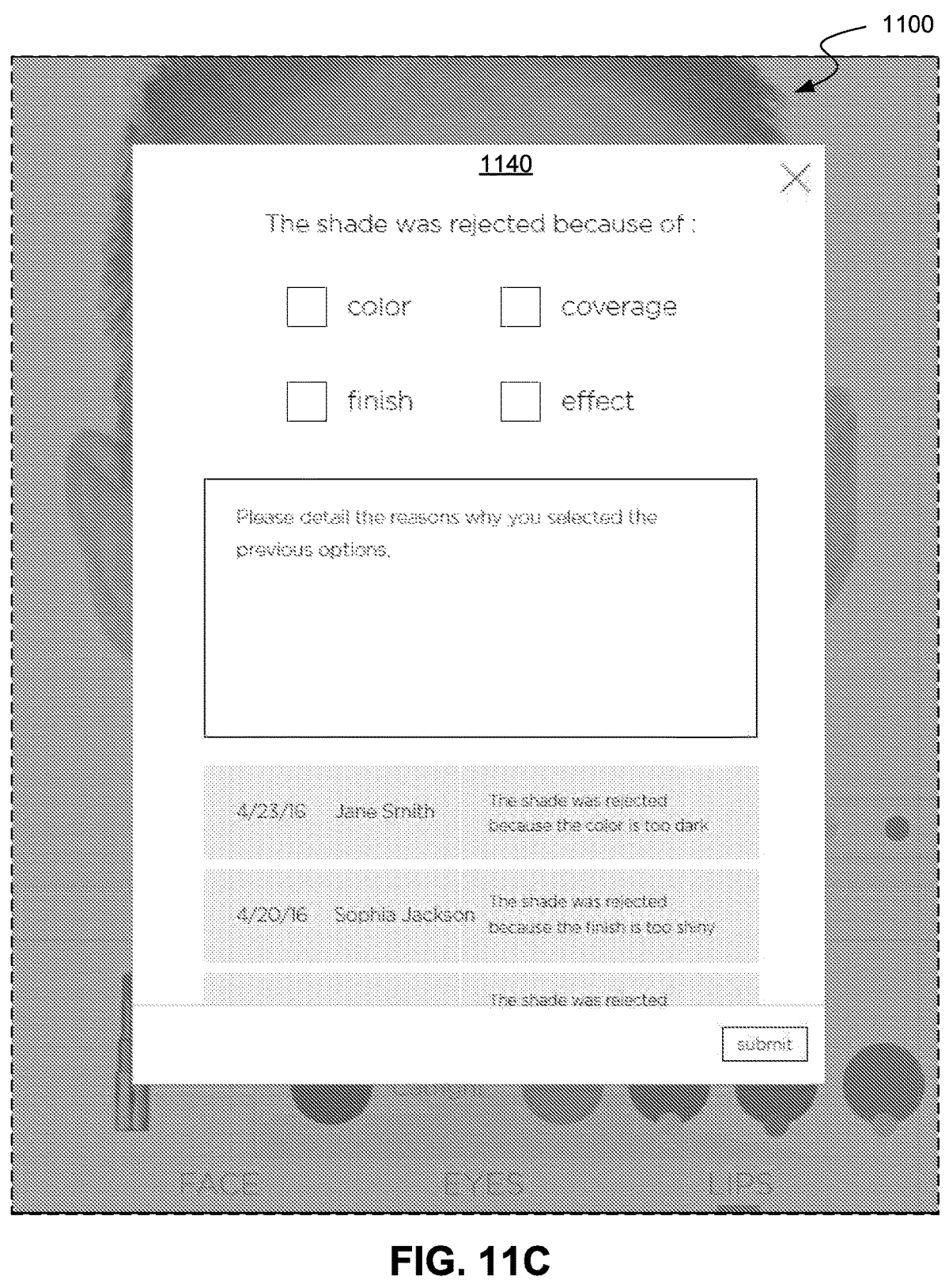

FIGS. 11A-11C show a series of screen captures of an example graphical user interface 1100 for a virtual makeup validation application. The example interface 1100 may include many similar features as interface 900 described with respect to FIGS. 9A-9E. For example, like example interface 900, example interface 1100 includes various elements that enable a user to select from available virtual makeup products in a product stack. For example a user can interact with element 1102 to filter or select by facial region (face, eyes, lips, etc.), element 1104 to filter or select by product type (e.g., lipstick, gloss, etc.), and element 1106 to filter or select by color or shade. A user may select a particular virtual makeup product and apply the virtual makeup product to a base image to view the resulting composite image 1108. As with interface 900, the selected virtual makeup product can be applied to the base image using several approaches, including but not limited to gestures received via touch screen display of the client device 102.

In some embodiments, the virtual makeup products available for selection via interface 1100 may be limited to those for which feedback is being solicited. For example, returning to the flow chart 1000 of FIG. 10, after internal calibration of a newly generated virtual makeup product at step 1006, the product may be released to receive external feedback (e.g., from a designer, manufacturer or vendor of the counterpart real-world makeup product) via a validation application. The reviewing entity may access the newly generated virtual makeup product (along with any other products needing review) and may provide feedback via interface 1100 of the validation application.

Returning to FIG. 11A, example interface 1100 also includes current feedback indicators 1110 for one or more of the reviewed makeup products as well as a feedback key 1112 that explains the feedback indicators. For example, in some embodiments, feedback indicators 1110 may be color coded, with green indicating acceptance, red indicating rejection, and yellow indicating any of internally validated/calibrated, review requested, review pending, or mixed feedback.

FIG. 11B, shows a second screen capture of example interface 1100 in which a user 1120 is inputting feedback for a selected virtual makeup product. As showing in FIG. 11B, a user 1120 may select a virtual makeup product (e.g., the Revolution Lipstick in the "Catfight" color) by touching the corresponding color swatch via element 1106. In response to touching the corresponding color swatch, a composite image 1108 may be displayed that includes a generated makeup image based on the virtual makeup product overlaid on the base image of a face. The reviewing user can view the composite image and make a determination on whether it accurately simulates the look of the counterpart real-world application. In response to a request to input feedback, interface 1100 may display feedback input elements through which the reviewing user may input their feedback. As an illustrative example, a user may hold their finger down over the color swatch associated with the virtual makeup product to request to input feedback. In response, interface 1100 may display an option to accept the current configuration of the product (e.g., by selecting element 1132 color coded in green) or to reject the product (e.g., by selecting element 1130 color coded in red). In response, the feedback may be stored and/or transferred to a receiving device operating as part of virtual makeup platform 120.

If the reviewing user rejects the current configuration of the virtual makeup product, interface 1100 may display a prompt 1140 to input additional details regarding the rejection, as shown in FIG. 11C. For example, prompt 1140 can request that the reviewing user identify a reason for the rejection (e.g., inaccurate color, shade, finish, coverage, etc.), as well as any additional details or comments on the rejection. In some embodiments comments by other reviewing users may be displayed showing their respective comments or reasons for rejection. Feedback input via prompt 1140 is stored and/or transmitted to a receiving device operating as part of virtual makeup platform 120 where it can then be used to inform and guide additional internal calibration (see step 1006 of FIG. 10) of the virtual makeup product. In some cases the individually input feedback from multiple reviewing users (e.g., members of an product review team of an entity associated with the real-world product) can be aggregated and/or analyzed to determine an approval decision on the product. For example, a simple majority of acceptances may trigger the approval of the product. Alternatively, less than unanimous approval of the product may trigger a rejection of the product.

As with interface 900 described with respect to FIGS. 9A-9E, interface 1100 represents an example interface and is presented for illustrative purposes. The specific look, arrangement, and interactive mechanics of each of each element of interface 1100 are not to be construed as limiting.

Example Computer System

Figure 12:
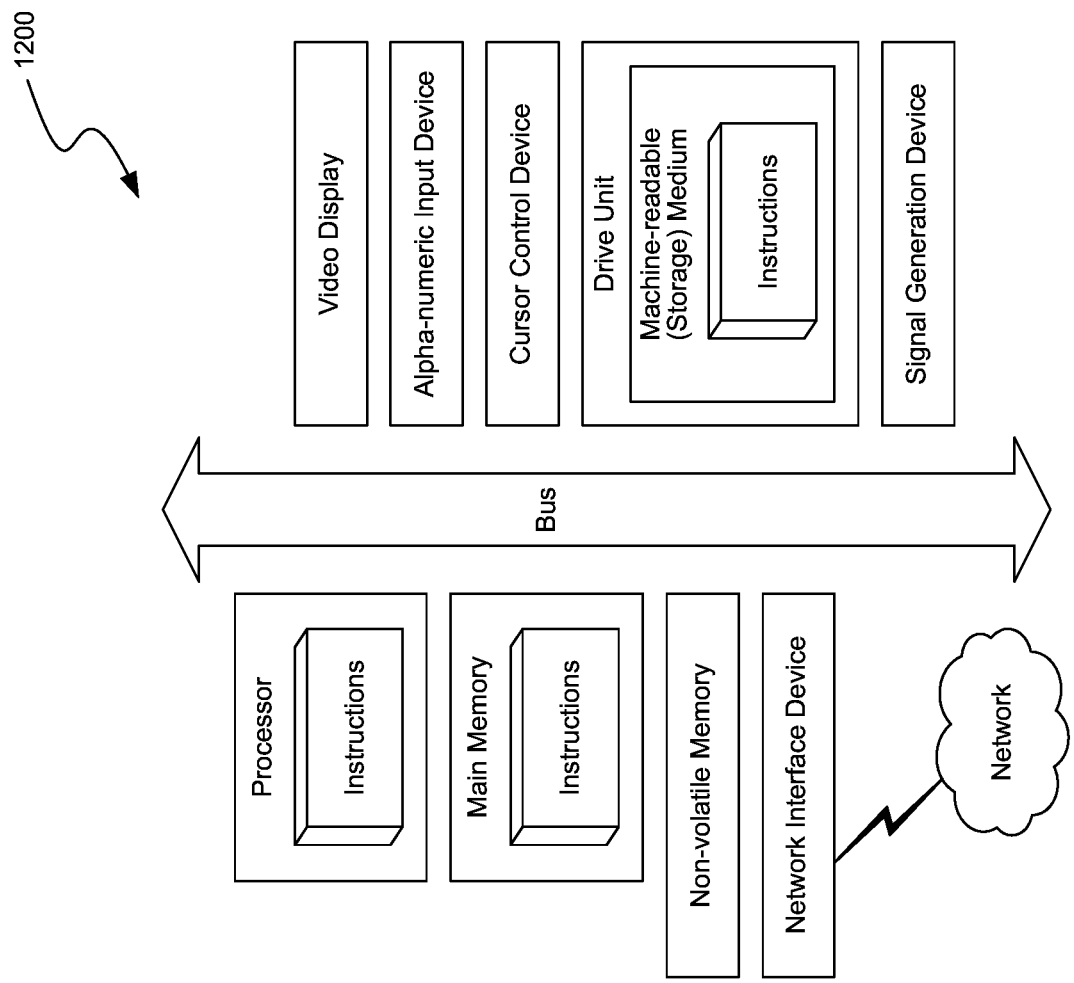
FIG. 12 shows a diagrammatic representation of a machine in the example form of a computer system.

FIG. 12 shows a diagrammatic representation of a machine 1200 in the example form of a computer system within which a set of instructions, for causing the machine to perform any one or more of the previously described techniques, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine may be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed repository, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1200 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Disclaimers

The description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Additional Remarks In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes some embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing some features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While some aspects of the disclosure may be presented herein in some claim forms, the inventors contemplate the various aspects of the disclosure in any number of claim forms. For example, while only one aspect of the disclosure is recited as a means-plus-function claim under 35 U.S.C. § 112(f), other aspects can likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

What is claimed is:

1. A computer-implemented method performed by a computer system for virtually applying makeup to a face depicted in a digital image to simulate physical application of a real-world makeup product, the method comprising:

acquiring, by the computer system, the digital image of the face;

receiving, by the computer system, a selection of a virtual makeup product, the virtual makeup product including makeup product definition data based on a selection of filters from a group of filters which when applied in combination result in generation of a visual effect on the digital image to simulate physical application of the real-world makeup product;

applying, by the computer system accessing the makeup product definition data for the selected virtual makeup product, the selected filters in layers to generate a makeup image having the visual effect of the virtual makeup product for a defined region of the face over which to apply the virtual makeup product; and causing display, by the computer system, of a composite makeup image including the makeup image overlaid onto the digital image, such that the composite makeup image simulates physical application of the real-world makeup product to the face depicted in the digital image.

2. The method of claim 1, wherein acquiring, by the computer system, the digital image of the face comprises:
acquiring a digital video depicting the face.

3. The method of claim 2, wherein causing display of the composite makeup image comprises:
continually updating the composite makeup image to track motion of the face in the digital video.

4. The method of claim 1, wherein the virtual makeup product is any of a virtual foundation, a virtual concealer, a virtual powder, a virtual blush, a virtual lipstick, a virtual lip gloss, a virtual eyeshadow, a virtual eyeliner, or a virtual mascara.

5. The method of claim 1, wherein causing display of the composite makeup image comprises:
layering image processing filters over the digital image that simulate physical application of the real-world makeup product.

6. The method of claim 1, wherein causing display of the composite makeup image comprises:
determining a layering arrangement including blend modes that define blending operation between layers to generate the visual effect.

7. The method of claim 1, wherein applying the selected filters comprises:
applying the selected filters in layers to the digital image defined according to a blend mode that defines a blending operation and given layers to which the blending operation is applied.

8. The method of claim 1, further comprising:
providing for display a before image including the digital image of the face without the selected virtual makeup product and an after image showing the composite makeup image separated by a dividing line, and
wherein, in response to receiving an input, the dividing line is adjusted to change relative sizes of the before image and the after image.

9. The method of claim 1, further comprising:
applying the selected filters in layers to the digital image, wherein the group of filters includes at least two of a sharpen filter, a feather filter, a light focus filter, a glitter filter, a color dots filter, a blur filter, or a texture image filter.

10. The method of claim 9, wherein applying the texture image filter comprises applying a masked texture image over a region of interest of the digital image of the face based on an opacity parameter of texture, wherein the opacity parameter is based on a coverage of the real-world makeup product.

11. The method of claim 9, wherein applying the color dots filter comprises applying dots overlaid onto the digital image based on one or more parameters including a shape of a dot distribution, a color of the dots, a spread of a coverage area, and an opacity of the dots, wherein the dots, when applied onto the digital image, simulate reflection of light off of the virtual makeup product.

12. The method of claim 9, wherein applying the glitter filter comprises applying two layers of randomly arranged light and dark dots to simulate applied glitter.

13. The method of claim 9, wherein applying the blur filter comprises smoothing a transition between pixels of the digital image based on a blur function representing values of width of the pixels in a horizontal and vertical direction.

14. The method of claim 9, wherein applying the feather filter comprises adjusting opacity of an applied visual effect over an area based on a defined decay in transparency over the area.

15. The method of claim 1, wherein causing display of the composite makeup image comprises:
generating, by the computer system, a mask in a transparent layer over the digital image, wherein the mask defines a boundary of region of interest within which the virtual makeup product is applied.

16. The method of claim 15, further comprising:
applying the visual effect of the virtual makeup product in layers within the mask to generate a makeup image, and
wherein causing display of the composite makeup image comprises:
overlaying the makeup image onto the digital image to generate the composite makeup image.

17. The method of claim 16, wherein the makeup image is a first makeup image, and the method further comprises:
receiving, by the computer system, a selection of a second virtual makeup product, the second virtual makeup product configured to generate a second visual effect on the digital image to simulate a second real-world makeup product;
generating, by the computer system, a second makeup image including the second visual effect on the digital image of the face; and
causing display, by the computer system, of a second composite image including the digital image, the first makeup image, and the second makeup image.

18. A computer system comprising:
a processing unit;
a memory unit coupled to the processing unit, the memory unit having instructions stored thereon, which when executed by the processing unit cause the computer system to perform functions comprising:
acquiring, by the computer system, a digital image of a face;
receiving, by the computer system, a selection of a virtual makeup product, the virtual makeup product including makeup product definition data based on a selection of filters from a group of filters which when applied in combination result in generation of a visual effect on the digital image to simulate physical application of a real-world makeup product;
applying, by the computer system accessing the makeup product definition data for the selected virtual makeup product, the selected filters in layers to generate a makeup image having the visual effect of the virtual makeup product for a defined region of the face over which to apply the virtual makeup product; and
causing display, by the computer system, of a composite makeup image including the makeup image overlaid onto the digital image, such that the composite makeup image simulates physical application of the real-world makeup product to the face depicted in the digital image.

19. The computer system of claim 18, wherein the function of causing display of the composite makeup image comprises:

layering image processing filters over the digital image that simulate physical application of the real-world makeup product.

20. A non-transitory computer readable medium having instructions stored thereon, which when executed by a processing unit of a computer system, cause the computer system to perform functions comprising:
acquiring, by the computer system, a digital image of a face;
receiving, by the computer system, a selection of a virtual makeup product, the virtual makeup product including makeup product definition data based on a selection of filters from a group of filters which when applied in combination result in generation of a visual effect on the digital image to simulate physical application of a real-world makeup product;
applying, by the computer system accessing the makeup product definition data for the selected virtual makeup product, the selected filters in layers to generate a makeup image having the visual effect of the virtual makeup product for a defined region of the face over which to apply the virtual makeup product; and
causing display, by the computer system, of a composite makeup image including the makeup image overlaid onto the digital image, such that the composite makeup image simulates physical application of the real-world makeup product to the face depicted in the digital image.

21. The non-transitory computer readable medium of claim 20, wherein:
acquiring, by the computer system, the digital image of the face comprises acquiring a digital video depicting the face; and
causing display of the composite makeup image comprises continually updating the composite makeup image to track motion of the face in the digital video.

22. A computer-implemented method for virtually applying makeup to a face depicted in a digital image, the method comprising:
causing display, via a touch screen display of a computing device, of a graphical user interface (GUI) including options to select a virtual makeup product to apply to the face depicted in the digital image, wherein the virtual makeup product is based on a visual effect configured to simulate a real-world makeup product;
causing display, via the GUI, of the digital image;
receiving a selection of the virtual makeup product in response to a first user input received via the GUI;
generating a makeup image based on the virtual makeup product in response to a second user input received via the GUI, the second user input including a touch gesture registered over the digital image, wherein the makeup image includes:
defining a stroke region based on the touch gesture received via the touch screen display;
applying a plurality of mask filters over the digital image, which when layered, form the makeup image, wherein each of the plurality of mask filters includes a mask boundary based on the defined stroke region; and
causing display, via the GUI, of a composite image including the makeup image overlaid on the digital image, such that the composite image simulates the application of the real-world makeup product to the face depicted in the digital image.

23. The method of claim 22, further comprising:
acquiring the digital image in response to a third user input received via the GUI, wherein acquiring the digital image includes receiving the digital image from any of: a local storage of the computing device; a remote storage communicatively coupled to the computing device via a network; or a camera of the computing device.

24. The method of claim 22, further comprising:
dynamically updating display of the composite image as the touch gesture is received via the touch screen display.

25. The method of claim 22, further comprising:
detecting a pressure of the touch gesture of the second user input; and
wherein the makeup image comprises adjusting the visual effect based on the pressure of the touch gesture.

* * * * *